(12) United States Patent
Tasai et al.

(10) Patent No.: US 9,509,022 B2
(45) Date of Patent: *Nov. 29, 2016

(54) ELECTRIC STORAGE DEVICE AND ELECTRIC STORAGE APPARATUS

(71) Applicant: GS Yuasa International Ltd., Kyoto-shi (JP)

(72) Inventors: Hiroshi Tasai, Ritto (JP); Seiji Nemoto, Ritto (JP)

(73) Assignee: GS Yuasa International Ltd., Kyoto-shi, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/469,328

(22) Filed: Aug. 26, 2014

(65) Prior Publication Data

US 2014/0363709 A1    Dec. 11, 2014

Related U.S. Application Data

(63) Continuation of application No. 13/344,453, filed on Jan. 5, 2012, now Pat. No. 8,846,226.

(30) Foreign Application Priority Data

Jan. 7, 2011 (JP) ................. 2011-002552
Jan. 7, 2011 (JP) ................. 2011-002553
Dec. 6, 2011 (JP) ................. 2011-266933

(51) Int. Cl.
*H01M 10/6551* (2014.01)
*H01M 10/6554* (2014.01)
(Continued)

(52) U.S. Cl.
CPC ....... *H01M 10/504* (2013.01); *B60H 1/00278* (2013.01); *H01M 10/613* (2015.04); *H01M 10/625* (2015.04); *H01M 10/643* (2015.04);
(Continued)

(58) Field of Classification Search
None
See application file for complete search history.

(56) References Cited

U.S. PATENT DOCUMENTS 5,756,227 A    5/1998    Suzuki et al.
5,756,229 A    5/1998    Pyszczek et al.
(Continued)

FOREIGN PATENT DOCUMENTS

CN    101263629 A    9/2008
CN    101622752 A    1/2010
(Continued)

OTHER PUBLICATIONS

Winter et al. "What Are Batteires, Fuel Cells, and Supercapacitors?" Chemical Reviews. 2004, 104, p. 4145-4269.*
(Continued)

*Primary Examiner* — Patrick Ryan
*Assistant Examiner* — Christopher Domone
(74) *Attorney, Agent, or Firm* — McGinn IP Law Group, PLLC

(57) ABSTRACT

An electric storage device includes a case having a cuboid shape and including a terminal surface having an electrode terminal, a bottom surface opposite to the terminal surface, a long side surface, and a short side surface. The device also includes an electric storage element formed by winding positive and negative plates being laminated via a separator, the electric storage element being housed in the case and being away from an inner surface of the long side surface, the electric storage element being in electrical connection with the electrode terminal, and a heat transfer member in contact with an outer surface of the long side surface.

12 Claims, 36 Drawing Sheets

(51) Int. Cl.
| | |
|---|---|
| H01M 10/6556 | (2014.01) |
| H01M 10/6567 | (2014.01) |
| H01M 10/613 | (2014.01) |
| H01M 10/647 | (2014.01) |
| H01M 10/653 | (2014.01) |
| B60H 1/00 | (2006.01) |
| H01M 10/625 | (2014.01) |
| H01M 10/643 | (2014.01) |
| H01M 2/02 | (2006.01) |

(52) U.S. Cl.
CPC ......... *H01M 10/647* (2015.04); *H01M 10/653* (2015.04); *H01M 10/6551* (2015.04); *H01M 10/6554* (2015.04); *H01M 10/6556* (2015.04); *H01M 10/6567* (2015.04); *H01M 2/0237* (2013.01); *H01M 2220/20* (2013.01); *Y02E 60/12* (2013.01)

(56) References Cited

U.S. PATENT DOCUMENTS

| | | | |
|---|---|---|---|
| 6,087,036 A | 7/2000 | Rouillard et al. | |
| 8,336,607 B2 | 12/2012 | Abadia et al. | |
| 8,551,631 B2 | 10/2013 | Tanahashi et al. | |
| 8,846,226 B2 * | 9/2014 | Tasai et al. | 429/72 |
| 2002/0028374 A1 * | 3/2002 | Yoshida | H01M 2/1241 429/94 |
| 2004/0191612 A1 | 9/2004 | Akita et al. | |
| 2007/0224498 A1 | 9/2007 | Kim et al. | |
| 2007/0254211 A1 | 11/2007 | Kambe et al. | |
| 2007/0269714 A1 * | 11/2007 | Watanabe et al. | 429/120 |
| 2008/0193832 A1 | 8/2008 | Doffin et al. | |
| 2008/0206628 A1 | 8/2008 | Honbou | |
| 2010/0099015 A1 | 4/2010 | Kawai | |
| 2010/0099023 A1 * | 4/2010 | Kuroda | H01M 2/0245 429/159 |
| 2010/0116468 A1 | 5/2010 | Kimura | |
| 2010/0163325 A1 | 7/2010 | Nakamura | |
| 2010/0227215 A1 | 9/2010 | Cheon et al. | |
| 2010/0297483 A1 | 11/2010 | Kawai | |
| 2011/0186365 A1 | 8/2011 | Abadia et al. | |
| 2011/0245373 A1 | 10/2011 | Yoda | |
| 2012/0026690 A1 | 2/2012 | Murata et al. | |

FOREIGN PATENT DOCUMENTS

| | | |
|---|---|---|
| DE | 10 2009 000 066 A1 | 7/2010 |
| JP | 08-148187 A | 6/1996 |
| JP | H09-199093 A | 7/1997 |
| JP | 2000-294302 A | 10/2000 |
| JP | 2002-231297 A | 8/2002 |
| JP | 2003-346882 A | 12/2003 |
| JP | 2009-110832 A | 5/2009 |
| JP | 2009-212055 A | 9/2009 |
| JP | 2009-252501 A | 10/2009 |
| JP | 2010-138357 A | 6/2010 |
| JP | 2010-186715 A | 8/2010 |
| JP | 2010-192207 A | 9/2010 |
| JP | 2010-277863 A | 12/2010 |
| WO | WO 2010/038163 A1 | 3/2012 |

OTHER PUBLICATIONS

U.S. Appl. No. 13/207,250, filed Aug. 2011, Byun.*
http://www.engineering toolbox.com/thermal-conductivity-d_429.html.
http://www.velcroconstruction.com/content/hook.
European Office Action dated Jan. 13, 2016.
European Search Report dated Aug. 14, 2015.

* cited by examiner

ELECTRIC STORAGE DEVICE AND ELECTRIC STORAGE APPARATUS

RELATED APPLICATIONS

This application is a Continuation Application of U.S. patent application Ser. No. 13/344,453, filed on Jan. 5, 2012.

CROSS REFERENCE TO RELATED APPLICATION

This application claims priority from Japanese Patent Application No. 2011-002552 filed on Jan. 7, 2011, Application No. 2011-002553 filed on Jan. 7, 2011, and Application No. 2011-266933 filed on Dec. 6, 2011. The entire content of these priority applications is incorporated herein by reference.

TECHNICAL FIELD

The present disclosure relates to an electric storage device and an electric storage apparatus.

BACKGROUND

A battery module (electric storage apparatus) described in JP-A-2000-348781 is conventionally known. The battery module is formed by arranging a plurality of cells (electric storage devices) to be electrically connected. The cell is formed by housing a power generating element in a case.

Heat is generated from the power generating element when the cell charges or discharges. The heat accumulates in the cell, and it is feared that the performance of the battery decreases if the temperature of the cell increases. Moreover, in the case of an assembled battery, it is feared that temperature variations in cells are caused by heat generation, and variations in the degrees of the decrease in battery performance are caused, too.

Hence, in the conventional technology, a cooling device for cooling a cell is placed on the exterior of the case. A coolant is circulated in the cooling device. An outer surface of the case is in contact with the cooling device; accordingly, heat generated in the power generating element upon charge or discharge is transferred to the cooling device through the case. Accordingly, the temperature inside the case decreases, so that the battery performance is inhibited from decreasing.

However, it is feared that the power generating element expands upon charge. Accordingly, it is feared that in an area where the power generating element is in contact with an inner surface of the case, the case is pressed and expanded by the expanded power generating element.

If the case expands, it is feared that a gap is formed between the expanded case and the cooling device. The gap includes an air layer. Since thermal conductivity is relatively low in the air layer, it is feared that heat is not sufficiently transferred from the case to the cooling device in the area where the gap is formed between the cooling device and the case. Consequently, it is feared that the temperature of the cell becomes high locally.

Especially when charge and discharge are repeated, the case repeats expansion and contraction. Accordingly, it becomes easy for a gap to be formed between the case and the cooling device, so that the need to cool the cell evenly is high.

SUMMARY

Therefore, there is a need in the art to provide an electric storage device, where the temperature of the electric storage device is inhibited from becoming high locally.

An aspect of the present invention is an electric storage device including: a case having a plurality of walls; an electric storage element housed in the case in a state of being away from at least one wall the plurality of walls; a heat transfer member in contact with an outer surface of the wall and away from the electric storage element among the plurality of walls.

According to the aspect of the present invention, the wall surface away from the electric storage element among the inner surfaces of the case is in contact with the heat transfer member. Hence, even if the electric storage element expands, the wall surface of the case in contact with the heat transfer member is away from the electric storage device and accordingly is inhibited from being pressed by the expanded electric storage element. As a result, even if the electric storage element expands, it is possible to hold the outer surface of the case and the heat transfer member in contact with each other.

The configuration where the inner surface of the wall of the case is away from the electric storage element includes a configuration where a gap is formed between the inner surface of the wall of the case and the electric storage element, and also includes a configuration where the case is not in direct contact with the electric storage element by positioning a buffer material between the inner surface of the wall of the case and the electric storage element.

BRIEF DESCRIPTION OF THE DRAWINGS

Illustrative aspects in accordance with the invention will be described in detail with reference to the following figures wherein.

DETAILED DESCRIPTION

Embodiment 1

Background Art

Figure 1:
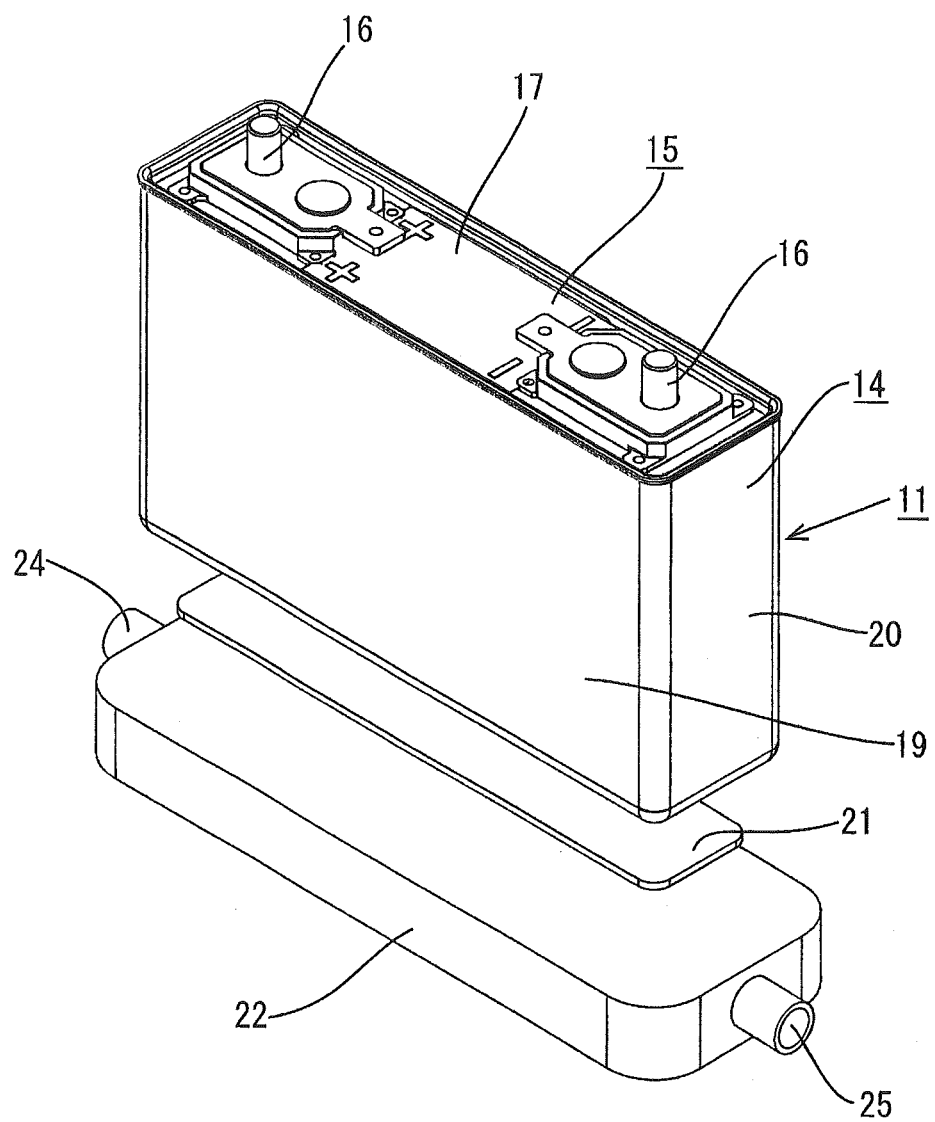
FIG. 1 is an exploded perspective view illustrating a cell according to Embodiment 1-1 of the present invention.

An assembled battery (battery module) described in JP-A-2000-348781 is conventionally known. The battery module is formed by arranging a plurality of cells to be electrically connected. The cell is formed by housing a power generating element in a case. A positive electrode and a negative electrode, which are electrically connected to the power generating element, are formed on the case.

Heat is generated from the power generating element upon charge or discharge of the cell. The heat accumulates in the cell; accordingly, if the temperature of the cell increases, the decrease in the performance of the battery is promoted. Moreover, in the case of an assembled battery, it is feared that temperature variations in cells are caused by heat generation, and variations in the degrees of the decrease in the battery performance are caused, too.

Hence, in the conventional technology, a cooling device for cooling the cell is placed on the exterior of the case. A coolant is circulated in the cooling device. The outer surface of the case is in contact with the cooling device; accordingly, the heat generated in the power generating element upon charge or discharge is transferred to the cooling device through the case. Accordingly, the temperature inside the case decreases, so that the battery performance is inhibited from decreasing.

Summary of the Technology Disclosed in the Specification

Problems to be Solved by the Technology Disclosed in the Specification

However, it is feared that, for example, if polar plates expands upon charge to expand the case, a gap is formed between the expanded case and the cooling device. The gap includes an air layer. Since thermal conductivity is relatively low in the air layer, it is feared that heat is not sufficiently transferred from the case to the cooling device in the area where the gap is formed between the cooling device and the case. Consequently, it is feared that the temperature of the cell becomes high locally.

Especially when charge and discharge are repeated, the case repeats expansion and contraction. Accordingly, it becomes easier for a gap to be formed between the case and the cooling device, so that the need to cool the cell evenly is high.

The technology disclosed in the specification has been completed based on the above situation, and an object thereof is to provide an electric storage device and an electric storage apparatus, which are inhibited from becoming high temperature locally.

Solutions to the Problems

The technology disclosed in the specification is an electric storage device including: a case; an electric storage element housed in the case; electrode terminals provided on the case and electrically connected to the electric storage element; a cooling member placed outside the case; and a heat transfer member placed between the case and the cooling member in contact with an outer surface of the case and an outer surface of the cooling member, and the heat transfer member can deform elastically and is formed of material having high thermal conductivity than air.

Moreover, the technology disclosed in the specification is an electric storage apparatus where a plurality of the electric storage devices is arranged and electrically connected.

If the electric storage device is charged, the electric storage element may expand. Consequently, the expanded electric storage element presses and expands the case. The heat transfer member in contact with the outer surface of the case is then pressed by the outer surface of the case while being sandwiched between the outer surface of the case and the outer surface of the cooling member. According to the technology disclosed in the specification, being able to deform elastically, the heat transfer member deforms elastically by being pressed by the outer surface of the case. Accordingly, the outer surface of the case and the outer surface of the heat transfer member are held in contact with each other as well as the outer surface of the heat transfer member and the outer surface of the cooling member are held in contact with each other, too. As a result, the heat generated in the electric storage element upon charge or discharge is transferred from the case to the cooling member through the heat transfer member; accordingly, it is possible to inhibit the temperature of the electric storage device from becoming high locally.

In contrast, the electric storage element contracts upon discharge and accordingly the case, too, contracts. According to the technology disclosed in the specification, being able to deform elastically, the heat transfer member is restored and deformed following the outer surface of the contracted case. Accordingly, the outer surface of the case and the outer surface of the heat transfer member are held in contact with each other. As a result, even if charge and discharge are repeated and accordingly the case repeats expansion and contraction, the outer surface of the case, the outer surface of the heat transfer member and the outer surface of the cooling member are held in contact with one another. Hence, even if the case repeats expansion and contraction, the heat generated in the electric storage element upon charge or discharge is securely transferred from the case to the cooling member through the heat transfer member, and therefore it is possible to inhibit the temperature of the electric storage device from becoming high locally.

The following embodiment is preferable as an embodiment of the technology disclosed in the specification. It is preferable that the cooling member should include a coolant to be circulated therein, and the cooling member should include a metal outer surface.

According to the above embodiment, since the outer surface of the cooling member is made of metal that is relatively hard, the cooling member resists deformation by the external pressure. Accordingly, it is possible to inhibit the cooling member from deforming even if the cooling member is pressed via the heat transfer member by the expansion of the case. As a result, it is possible to inhibit a circulation path of the coolant from deforming; accordingly, it is possible to inhibit pressure drop from being caused in the coolant circulated in the cooling member. Hence, it is possible to inhibit a decrease in the cooling efficiency of the cooling member.

It is preferable that the cooling member should include a coolant to be circulated therein, and the coolant should be a liquid.

The use of a liquid for a coolant makes it possible to obtain an excellent effect that the cooling efficiency is not dependent on the outdoor temperature compared with what is called air cooling that uses air as a coolant.

Moreover, in the case of air cooling, it is feared that a foreign substance enters the inside of the cooling member with the inflow of outside air. In contrast, according to the above embodiment, since the coolant is set to be a liquid, it is possible to inhibit the entry of a foreign substance into the cooling member.

If the electric storage device is installed on a vehicle provided with a radiator, a radiator coolant can be suitably used as the coolant.

According to the above embodiment, there is no need to separately prepare a coolant to be circulated in the cooling member if a radiator coolant used for a vehicle can be used. The radiator coolant can include antifreeze such as ethylene glycol.

It is preferable that the case should be cuboid shaped, and the wall surfaces of the case should include a terminal surface where the electrode terminals are formed, a bottom surface opposite to the terminal surface, a long side surface and a short side surface, and the heat transfer member should be in contact with both or one of the bottom surface and the short side surface.

Having a relatively large area, the long side surface deforms more largely than the short side surface when the internal pressure of the case increases. Hence, the heat transfer member is brought into contact with both or one of the bottom and short side surfaces that are different from the long side surface; accordingly, it is possible to securely hold the outer surface of the case and the heat transfer member in contact with each other.

On the other hand, a sufficient space for attaching the heat transfer member and the cooling member in a state where the heat transfer member and the cooling member are insulated from the electrode terminals may not be secured on the terminal surface where the electrode terminals are formed. Hence, it is feared that if the heat transfer member is attempted to be attached to the terminal surface, it is not possible to secure a sufficient contact area between the outer surface of the case and the heat transfer member. According to the above embodiment, it is possible to secure a sufficient contact area between the outer surface of the case and the heat transfer member by bringing the heat transfer member into contact with the bottom surface or the short side surface.

It is preferable that the heat transfer member should be in contact with the wall surface away from the electric storage element among the wall surfaces of the case.

It is feared that the electric storage element expands upon charge. Accordingly, it is feared that in an area where the electric storage element is in contact with the inner surface of the case, the case is pressed and expanded by the expanded electric storage element.

According to the above embodiment, the wall surface away from the electric storage element among the inner surfaces of the case is in contact with the heat transfer member. Hence, even if the electric storage element expands, the wall surface of the case in contact with the heat transfer member is inhibited from being pressed by the expanded electric storage element since the wall surface is away from the electric storage element. As a result, even if the electric storage element expands, it is possible to securely hold the outer surface of the case and the heat transfer member in contact with each other.

It is preferable that the heat transfer member should be formed of insulating material.

A potential is generated in the electric storage element; accordingly, a potential is generated between the electric storage element and the case. Consequently, a potential is generated between the case and the cooling member, too. In the above embodiment, since the heat transfer member placed between the case and the cooling member is formed of insulating material, current is inhibited from flowing between the case and the cooling member. As a result, current is inhibited from corroding the case or the cooling member.

Effect of the Technology Disclosed in the Specification

According to the technology disclosed in the specification, it is possible to inhibit the temperature of an electric storage device from becoming high locally.

Figure 2:
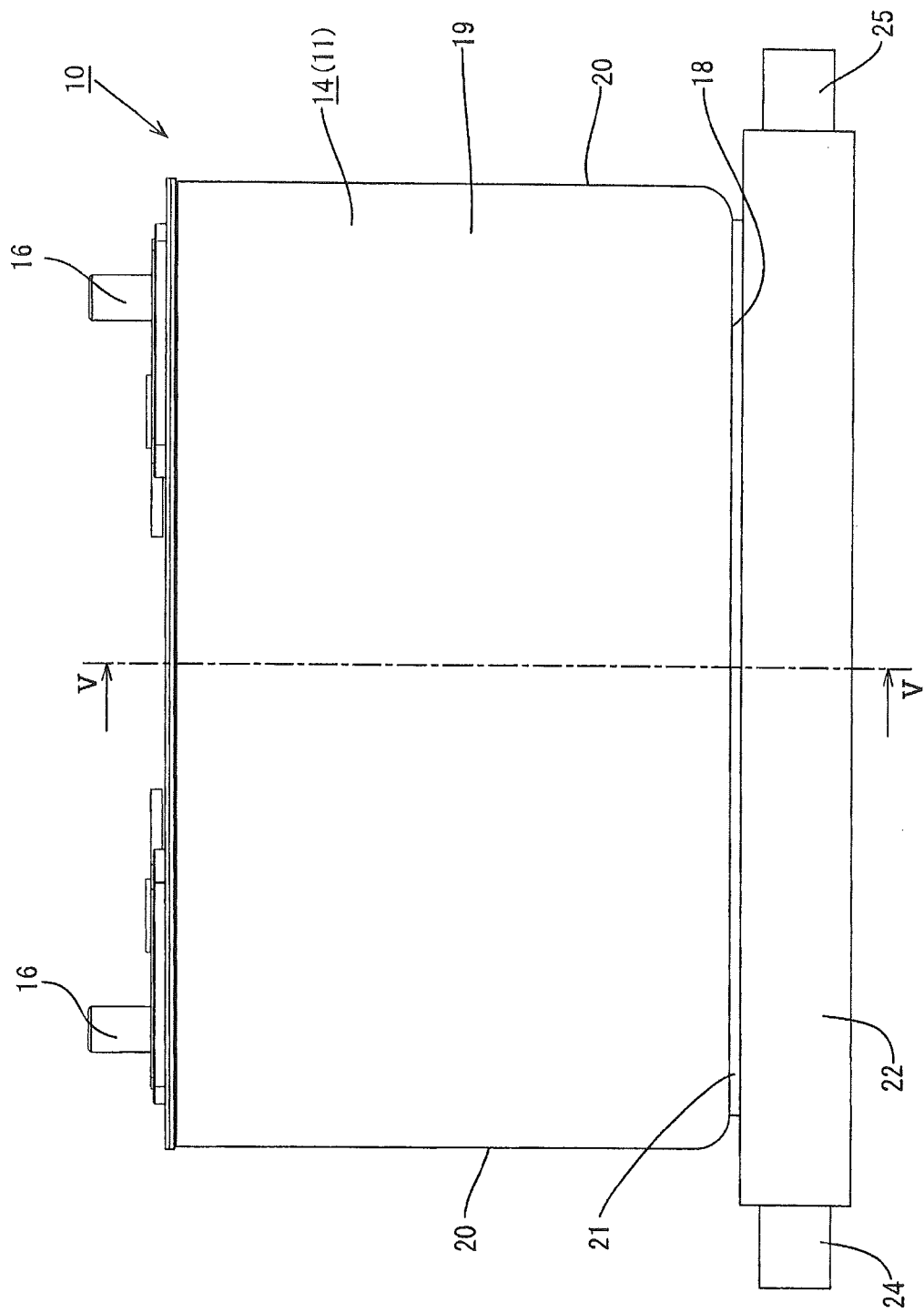
FIG. 2 is a side view illustrating the cell.
Figure 3:
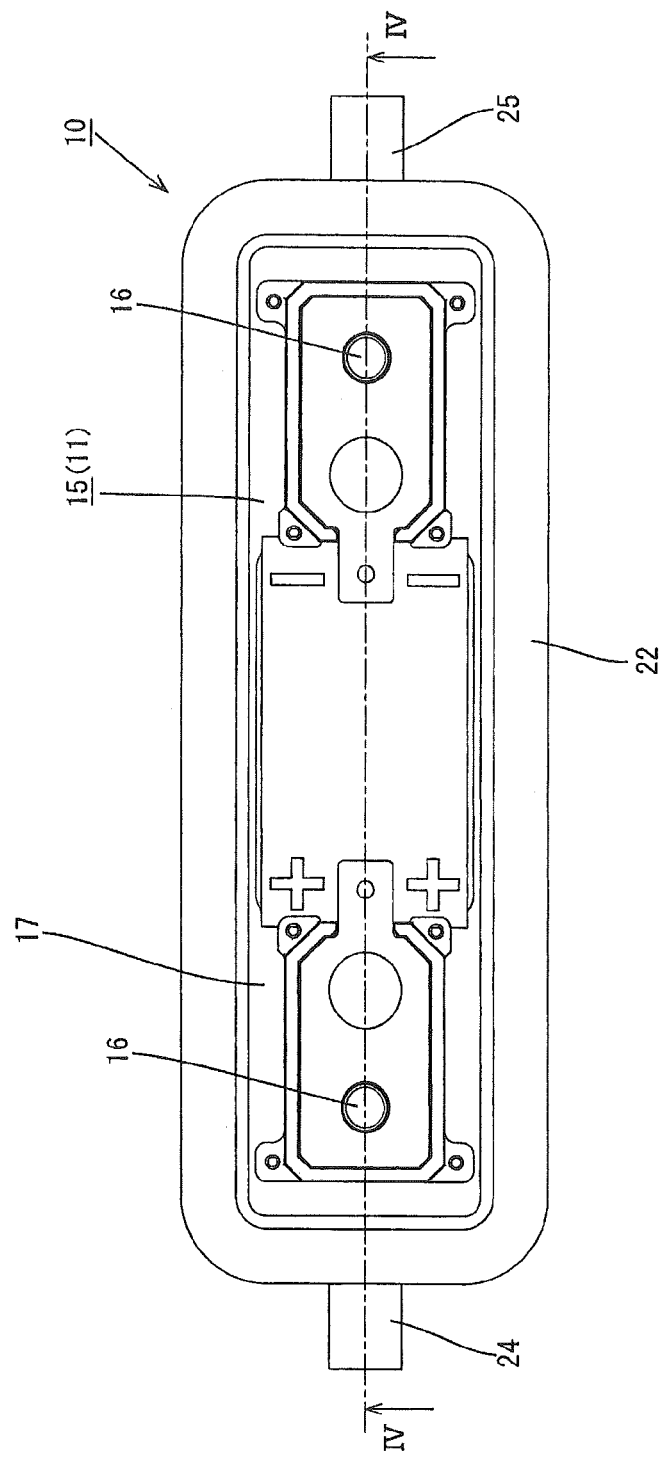
FIG. 3 is a plan view illustrating the cell.

A description will be given of Embodiment 1-1 of the present invention with reference to FIGS. 1 to 5. A cell (electric storage device) 10 according to the embodiment is formed by housing power generating elements (electric storage elements) 12 in a case 11. A description will hereinafter be given, assuming that the top and bottom of FIG. 2 are the top and bottom, respectively.

Figure 4:
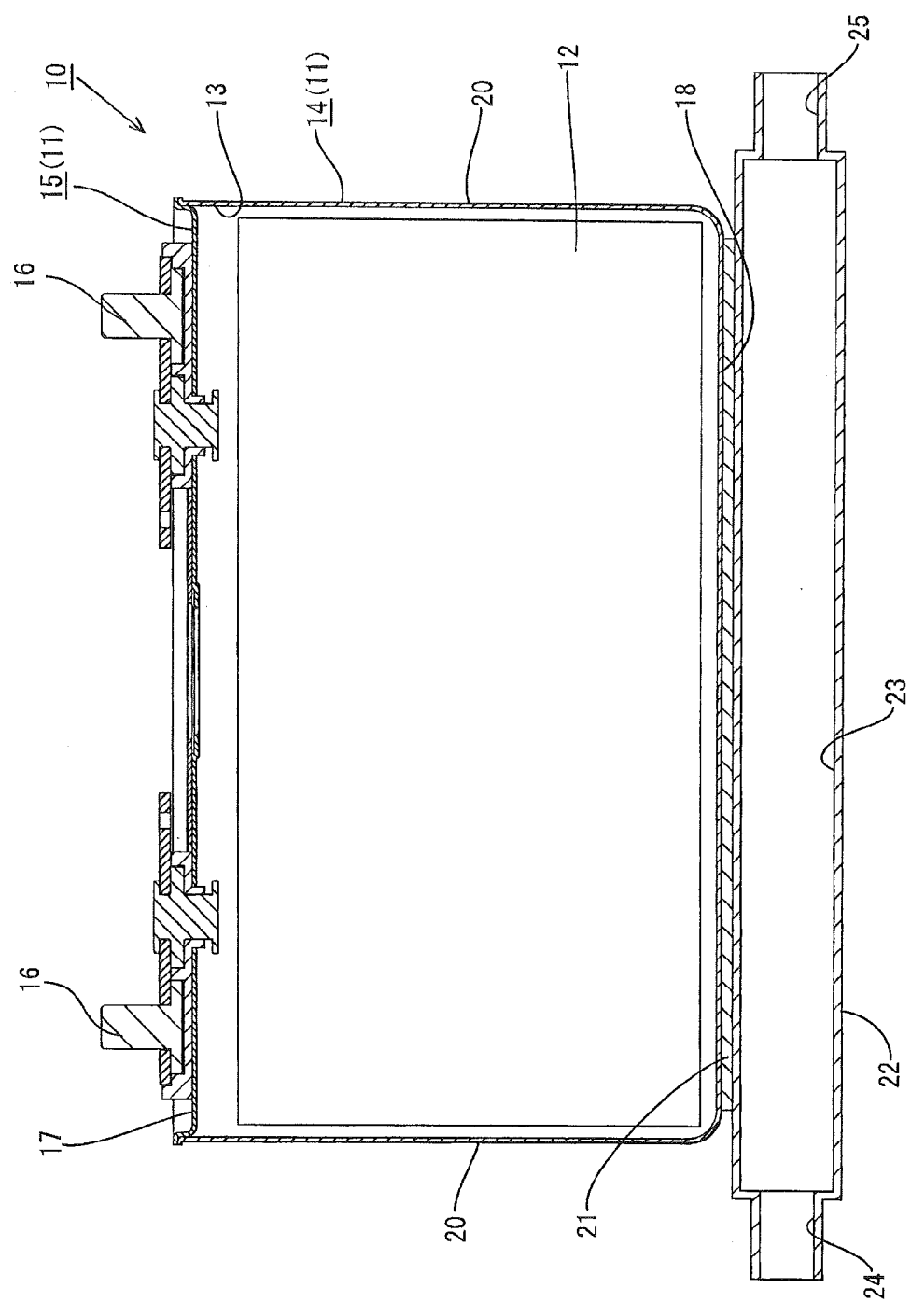
FIG. 4 is a cross-sectional view taken along line IV-IV in FIG. 3.

As shown in FIG. 4, the case 11 includes a plurality of walls to form a flat and approximately cuboid shape. The case 11 includes a case body 14 where an opening 13 opening upward is formed, and a lid member 15 assembled to the case body 14 and covering the opening 13 of the case 11. The case body 14 is made of metal, and it is possible to use, for the case body 14, arbitrary metal such as aluminum, aluminum alloy and stainless as necessary.

Two electrode terminals 16 and 16 electrically connected with the power generating elements 12 protrude upward to be formed in places near both left and right ends in FIG. 4 on the lid member 15. The electrode terminals 16 are formed of a positive terminal and a negative terminal. Although the details are not illustrated, the positive terminal is electrically connected to a positive plate of the power generating element 12, and the negative plate is electrically connected to a negative plate of the power generating element 12.

Figure 5:
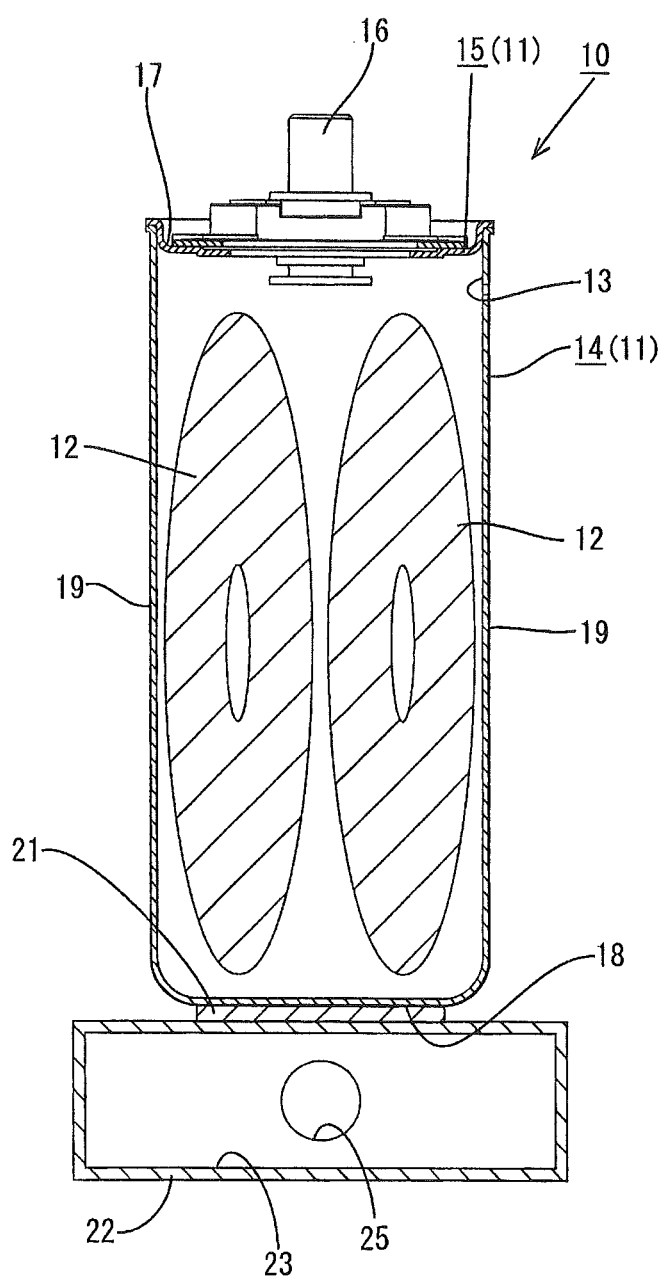
FIG. 5 is a cross-sectional view taken along line V-V in FIG. 2.

As shown in FIG. 5, the power generating element 12 is formed by winding the positive and negative plates being laminated via a separator. In the embodiment, two power generating elements 12 and 12 are housed in one case 11.

As shown in FIG. 2, outer surfaces of the case 11 include a terminal surface 17 where the electrode terminals 16 are formed (the top surface in FIG. 2), a bottom surface 18 located on an opposite side to the terminal surface 17 (the bottom surface in FIG. 2), a long side surface 19 having a relatively large area, and a short side surface 20 having a relatively small area. The walls of the case 11 is configured of the terminal surface 17, the bottom surface 18, the long side surface 19 and the short side surface 20.

As shown in FIG. 5, the power generating elements 12 are housed in the case 11 in positions where the winding axes are oriented in a direction intersecting with the short side surface 20. The two power generating elements 12 and 12 are housed by being arranged in a direction intersecting with the long side surface 19 of the case 11. Moreover, the power generating elements 12 are housed in the case 11 in a position away from the bottom surface 18 and the terminal surface 17 among the inner surfaces of the case 11. The power generating elements 12 being away from the inner surface of the case 11 includes a configuration where a buffer material is positioned between the power generating elements 12 and the inner surface of the case 11.

The case 11 is configured to be filled with an electrolyte (not shown) including an organic solvent. As an organic solvent, it is possible to use, for example, ethylene carbonate, propylene carbonate, buthylene carbonate, dimethyl carbonate, diethyl carbonate, ethyl methyl carbonate, gamma-butyrolactone, gamma-valerolactone, methyl acetate, methyl propionate, tetrahydrofuran, 2-methyltetrahydrofuran, tetrahydropyran, dimethoxyethane, dimethoxymethane, ethylene methyl phosphate, ethyl ethylene phosphate, trimethyl phosphate, and triethyl phosphate. Only one kind may be selected from these organic solvents to be used, or the combination of two or more kinds may be used.

Cited as a dissolved substance of an electrolyte are an inorganic lithium salt such as $LiClO_4$, $LiPF_6$, and $LiBF_4$, a fluorinated organic lithium salt such as $LiCF_3SO_3$, $LiN(CF_3SO_2)_2$, $LiN(CF_3CF_2SO_2)_2$, and $LiC(CF_3SO_2)_3$, and the like. Only one kind may be selected from these dissolved substances to be used, or the combination of two or more kinds may be used.

A heat transfer member 21 made of synthetic resin is placed on the bottom surface 18 of the case 11 in contact with the bottom surface 18 of the case 11. The heat transfer member 21 can deform elastically, and is formed of synthetic resin with insulation properties. Moreover, the heat transfer member 21 is formed of material having higher thermal conductivity than air. In the embodiment, material having a thermal conductivity of 0.2 W/m·K to 5.0 W/m·K is used. It is possible to use, for the heat transfer member 21, an arbitrary synthetic resin, such as polyamide including nylon 66, acrylic resin, silicone resin, polyester resin, or polyolefin resin, as necessary.

The heat transfer member 21 according to the embodiment has a sheet shape having a thickness of 1 mm. The heat transfer member 21 is approximately rectangular shaped, and is formed into a shape slightly smaller than the bottom surface 18 of the case 11. The thickness of the heat transfer member 21 is set to 1 mm in the embodiment, but is not limited to this, and can be formed into an arbitrary thickness as necessary.

A cooling member 22 is placed on an undersurface of the heat transfer member 21. The undersurface of the heat transfer member 21 is in contact with a top surface of the cooling member 22. The cooling member 22 has an approximately cuboid shape and is formed into a shape slightly larger than the heat transfer member 21. At least the outer surface of the cooling member 22 is made of metal such as copper, copper alloy, stainless, aluminum, or aluminum alloy. Copper is used in the embodiment.

AS shown in FIG. 4, a circulation path 23 for circulating a coolant (not shown) is formed in the cooling member 22. An inlet port 24 that communicates with the circulation path 23 and through which the coolant flows into the circulation path 23 and an outlet port 25 through which the coolant flows out of the circulation path 23 are formed in the cooling member 22. The inlet port 24 or the outlet port 25 is connected to an unillustrated pump via an unillustrated pipe 55, and the coolant circulates in the order of the pipe 55, the inlet port 24, the circulation path 23, the outlet port 25 and the pipe 55.

A liquid such as water, an organic solvent, or oil is used as a coolant in the embodiment. An arbitrary liquid such as water, mineral oil, alkylbenzene, polybutene, alkylnaphthalene, alkyldiphenylethane, silicone oil or ethylene glycol can be used as a coolant as necessary.

The heat transfer member 21 may be formed of material having viscosity. Moreover, an adhesive layer may be formed on the surface of the heat transfer member 21. Moreover, the heat transfer member 21, the bottom surface 18 of the case 11 and an outer surface of the cooling member 22 may be bonded via the adhesive layer. The above configuration makes it possible to securely bring the heat transfer member 21, the bottom surface 18 of the case 11 and the cooling member 22 into contact with one another.

Operation and Effect

Next, a description will be given of the operation and effect of the embodiment. The heat transfer member 21 is placed between the bottom surface 18 of the case 11 and the top surface of the cooling member 22 in the cell 10 according to the embodiment. The heat transfer member 21 is in contact with the outer surface of the case 11 as well as is in contact with the outer surface of the cooling member 22. Moreover, the heat transfer member 21 can deform elastically and is formed of synthetic resin having higher thermal conductivity than air.

If the cell 10 is charged, the power generating element 12 may expand. Consequently, the expanded power generating element 12 presses and expands the case 11. The heat transfer member 21 in contact with the outer surface of the case 11 is then pressed by the outer surface of the case 11 while being sandwiched between the outer surface of the case 11 and the outer surface of the cooling member 22. Being able to deform elastically, the heat transfer member 21 deforms elastically by being pressed by the outer surface of the case 11. Accordingly, the outer surface of the case 11 and the outer surface of the heat transfer member 21 are held in contact with each other as well as the outer surface of the heat transfer member 21 and the outer surface of the cooling member 22 are held in contact with each other. As a result, the heat generated in the power generating element 12 upon charge or discharge is transferred from the case 11 to the cooling member 22 through the heat transfer member 21; accordingly, it is possible to inhibit the temperature of the cell 10 from becoming high locally.

In contrast, the power generating element 12 contracts upon discharge, and accordingly the case 11, too, contracts. At this time, being able to deform elastically, the heat transfer member 21 is restored and deformed following the outer surface of the contracted case 11. Accordingly, the outer surface of the case 11 and the outer surface of the heat transfer member 21 are held in contact with each other. As a result, even if charge and discharge are repeated and accordingly the case 11 repeats expansion and contraction, the outer surface of the case 11, the outer surface of the heat transfer member 21 and the outer surface of the cooling member 22 are held in contact with one another. Hence, even if the case 11 repeats expansion and contraction, the heat generated in the power generating element 12 upon charge or discharge is securely transferred from the case 11 to the cooling member 22 through the heat transfer member 21, and therefore it is possible to inhibit the temperature of the cell 10 from becoming high locally.

Moreover, since the outer surface of the cooling member 22 is made of metal that is relatively hard in the embodiment, the cooling member 22 resists deformation by the external pressure. Accordingly, it is possible to inhibit the cooling member 22 from deforming even if the cooling member 22 is pressed via the heat transfer member 21 by the expansion of the case 11. As a result, it is possible to inhibit the circulation path 23 of a coolant from deforming; accordingly, it is possible to inhibit pressure drop from being caused in the coolant circulated in the cooling member 22. Therefore, it is possible to inhibit a decrease in the cooling efficiency of the cooling member 22.

Moreover, a liquid is used as a coolant in the embodiment. Accordingly, it is possible to obtain an excellent effect that the cooling efficiency is not dependent on the outdoor temperature compared with what is called air cooling that uses air as a coolant.

Moreover, in the case of air cooling, it is feared that a foreign substance enters the inside of the cooling member 22 with the inflow of outside air. In contrast, according to the above embodiment, since the coolant is set to be a liquid, it is possible to inhibit the entry of a foreign substance into the cooling member 22.

Moreover, the case 11 is filled with an electrolyte including an organic solvent in the embodiment. In the case where an electrolyte includes an organic solvent in this manner, it is feared that if a cell is used at relatively high temperature, gas being a product of the decomposition of the organic solvent evolves. Consequently, it is feared that as the internal pressure of the case 11 increases and the number of charge and discharge cycles increases, the case 11 gradually expands. Also in such a case, being formed of material capable of deforming elastically, the heat transfer member 21 can deform following the expansion of the case 11. As a result, it is possible to hold the outer surfaces of the case 11, the heat transfer member 21 and the cooling member 22 in contact with one another. Accordingly, even if the number of charge and discharge cycles increases, it is possible to securely inhibit the temperature of the cell 10 from becoming high temperature locally.

Moreover, the heat transfer member 21 is in contact with the bottom surface 18 in the embodiment. Having a relatively large area, the long side surface 19 of the case 11 deforms more largely than the bottom surface 18 and the short side surface 20 when the internal pressure of the case 11 increases. Hence, the heat transfer member 21 is brought into contact with the bottom surface 18 that is different from the long side surface 19; accordingly, it is possible to securely hold the outer surface of the case 11 and the heat transfer member 21 in contact with each other.

A sufficient space for attaching the heat transfer member 21 and the cooling member 22 in a state where the heat transfer member 21 and the cooling member 22 are insulated from the electrode terminals 16 may not be secured on the terminal surface 17 where the electrode terminals 16 are formed. Accordingly, it is feared that if the heat transfer member 21 is attempted to be attached to the terminal surface 17, it is not possible to secure a sufficient contact area between the outer surface of the case 11 and the heat transfer member 21. According to the above embodiment, it is possible to secure a sufficient contact area between the outer surface of the case 11 and the heat transfer member 21 by bringing the heat transfer member 21 into contact with the bottom surface 18.

Moreover, it is feared that the power generating element 12 expands upon charge. Accordingly, it is feared that in an area where the power generating element 12 is in contact with the inner surface of the case 11, the case 11 is pressed and expanded by the expanded power generating element 12.

Hence, in the embodiment, the heat transfer member 21 is configured to be in contact with the bottom surface 18 having a relatively large space in between with the power generating element 12 among the wall surfaces of the case 11. Accordingly, the wall surface having a relatively large space in between with the power generating element 12 among the wall surfaces of the case 11 is in contact with the heat transfer member 21. Hence, even if the power generating element 12 expands, the wall surface of the case 11 in contact with the heat transfer member 21 is away from the power generating element 12 and accordingly is inhibited from being pressed by the expanded power generating element 12. As a result, even if the power generating element 12 expands, it is possible to securely hold the outer surface of the case 11 and the heat transfer member 21 in contact with each other.

Moreover, a potential is generated in the power generating element 12; accordingly, a potential is generated between the power generating element 12 and the case 11. Consequently, a potential is generated between the case 11 and the cooling member 22, too. Accordingly, since current flows between the case 11 and the cooling member 22, it is feared that the case 11 or the cooling member 22 corrodes. Hence, in the embodiment, the heat transfer member 21 is formed of insulating material. Accordingly, current is inhibited from flowing between the case 11 and the cooling member 22. As a result, current is inhibited from corroding the case 11 or the cooling member 22.

Embodiment 1-2

Figure 6:
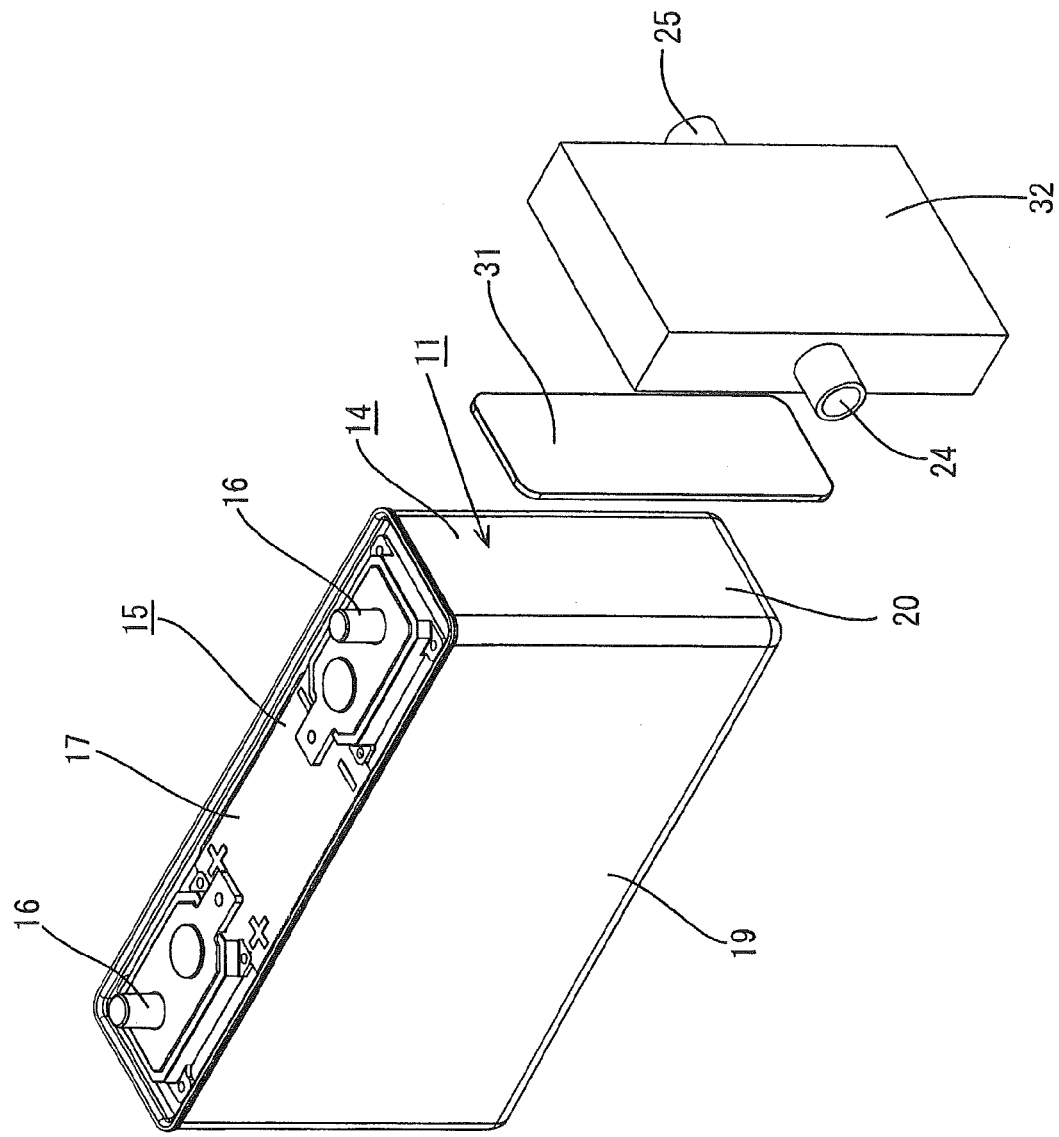
FIG. 6 is an exploded perspective view illustrating a cell according to Embodiment 1-2 of the present invention.
Figure 7:
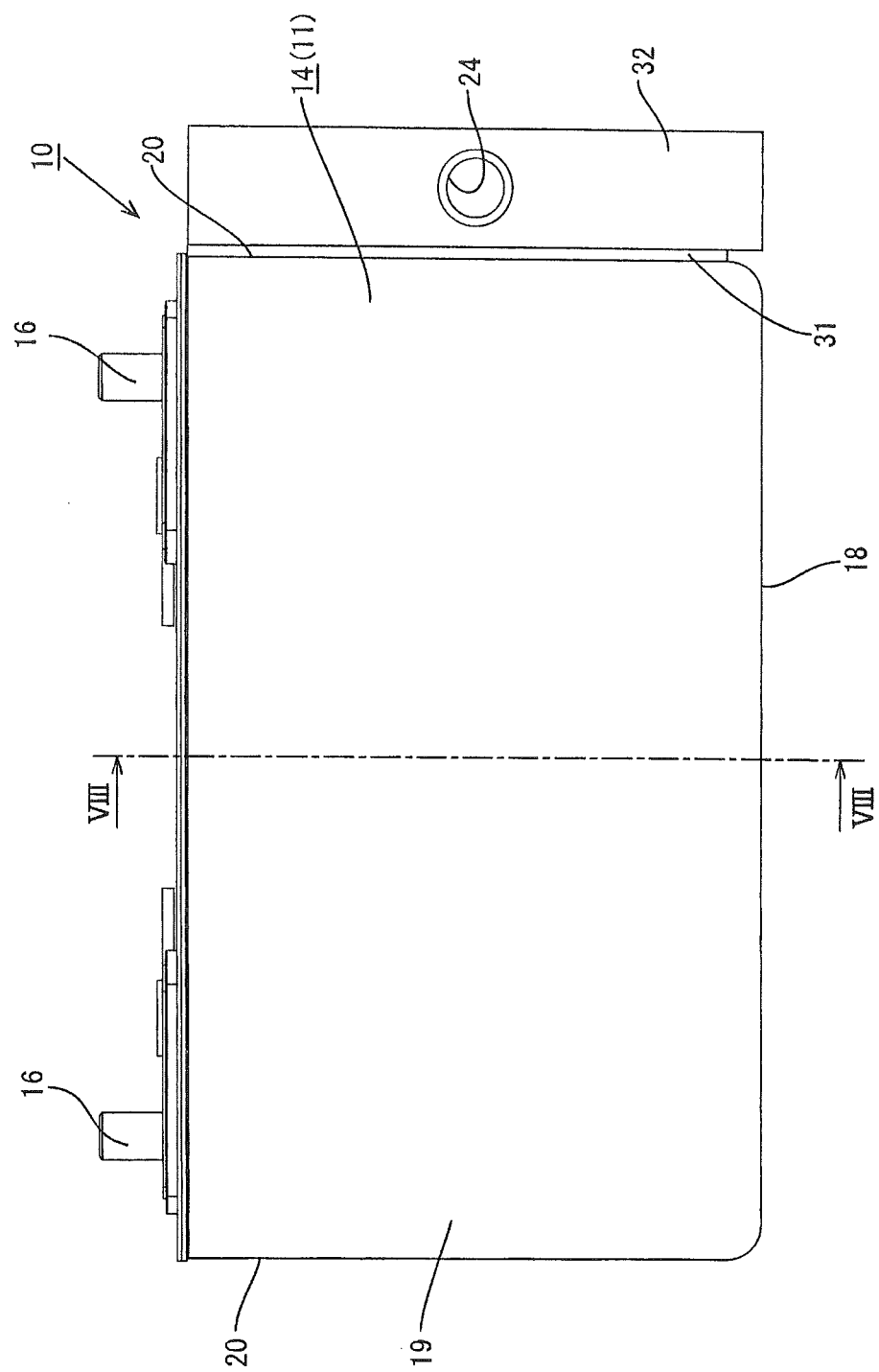
FIG. 7 is a side view illustrating the cell.

Next, a description will be given of Embodiment 1-2 of the present invention with reference to FIGS. 6 to 8. In the embodiment, a heat transfer member 31 is configured to be in contact with the short side surface 20 of the case 11. The heat transfer member 31 is approximately rectangular shaped, and is formed into a shape slightly smaller than the short side surface 20 of the case 11.

A cooling member 32 is placed on a surface of the heat transfer member 31 opposite to the short side surface 20 of the case 11. The heat transfer member 31 is in contact with both of the short side surface 20 of the case 11 and the cooling member 32.

Since the configuration except the above is approximately similar to that of Embodiment 1-1, the overlapped description will be omitted while the same reference numerals are attached to the same members.

Next, a description will be given of the operation and effect of the embodiment. As shown in FIG. 7, in the embodiment, the heat transfer member 31 is in contact with the short side surface 20 that is different from the long side surface 19 having a relatively large area. Accordingly, it is possible to securely hold the outer surface of the case 11 and the heat transfer member 31 in contact with each other.

Figure 8:
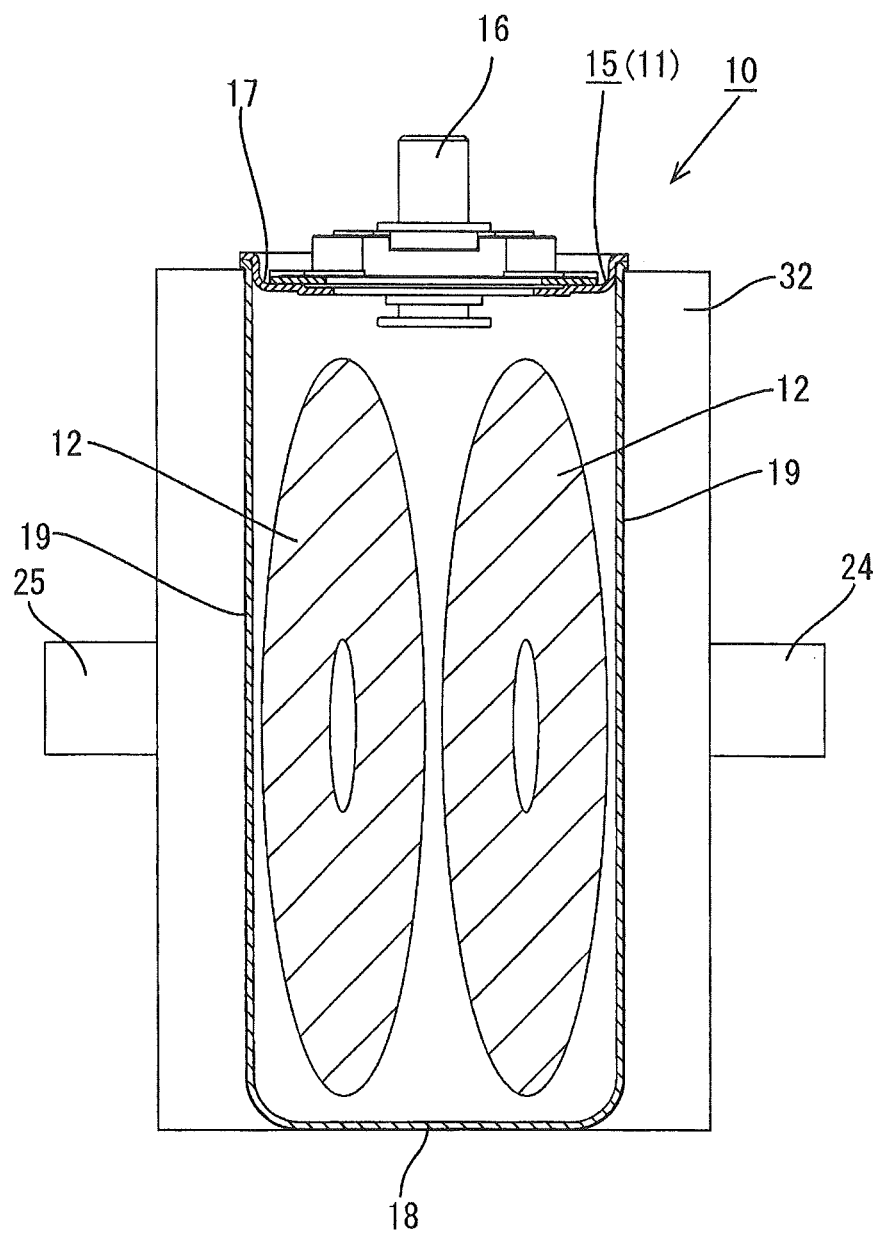
FIG. 8 is a cross-sectional view taken along line VIII-VIII in FIG. 7.

Moreover, as shown in FIG. 8, in the embodiment, the power generating elements 12 are housed in the case 11 in positions where the winding axes are oriented in a direction intersecting with the short side surface 20. When charge and discharge are repeated, the power generating element 12 repeats expansion and contraction outward in a direction of the diameter of the winding axis. However, the deformation amount of the power generating element 12 relative to the axis direction is relatively small. Accordingly, in the embodiment, even if the power generating element 12 expands, it is hard for the power generating element 12 to apply a pressing force to the short side surface 20 of the case 11 located outward from the axis direction of the power generating element 12. Since the heat transfer member 31 is in contact with the short side surface 20 of the case 11, even if the power generating element 12 expands, it is possible to securely hold the outer surface of the case 11 and the heat transfer member 31 in contact with each other.

Embodiment 1-3

Figure 9:
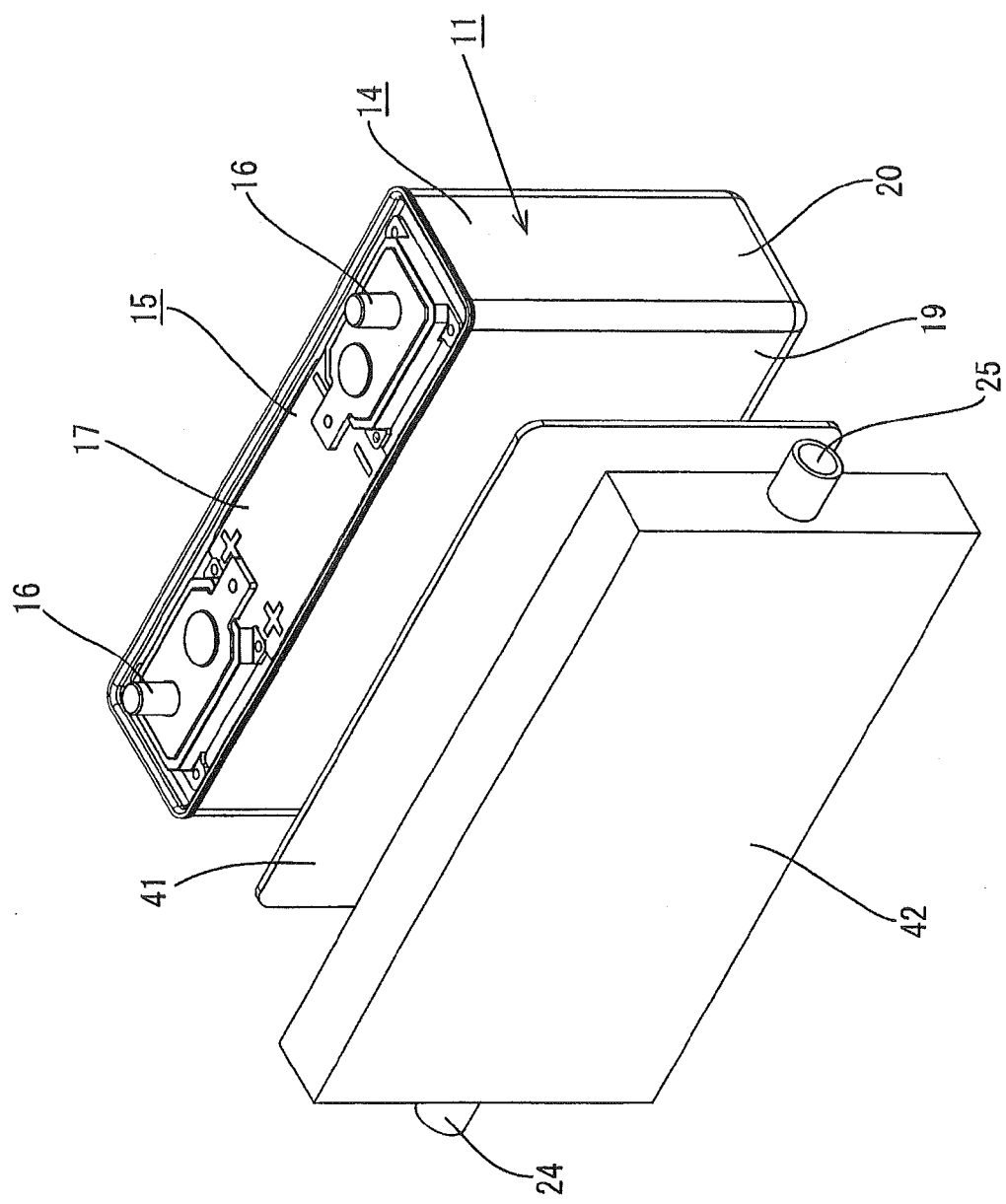
FIG. 9 is an exploded perspective view illustrating a cell according to Embodiment 1-3 of the present invention.
Figure 10:
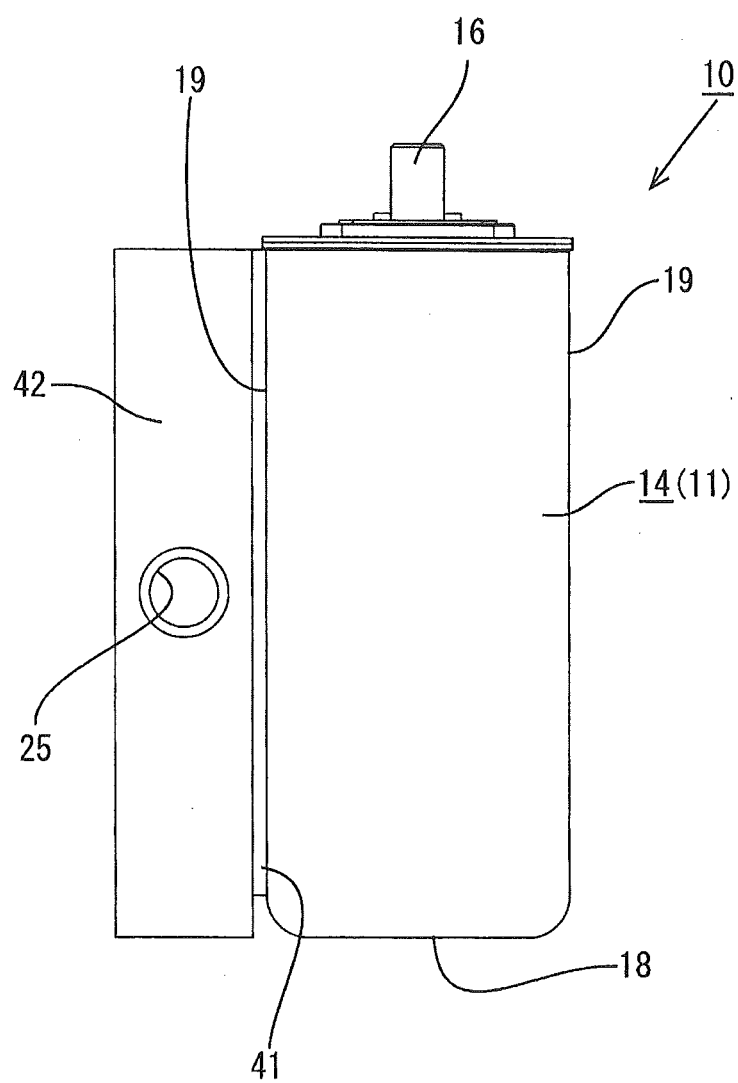
FIG. 10 is a side view illustrating the cell.

Next, a description will be given of Embodiment 1-3 of the present invention with reference to FIGS. 9 and 10. In the embodiment, a heat transfer member 41 is configured to be in contact with the long side surface 19 of the case 11. The heat transfer member 41 is approximately rectangular shaped, and is formed into a shape slightly smaller than the long side surface 19 of the case 11 (refer to FIG. 9).

A cooling member 42 is placed on a surface of the heat transfer member 41 opposite to the long side surface 19 of the case 11. The heat transfer member 41 is in contact with both of the long side surface 19 of the case 11 and the cooling member 42 (refer to FIG. 10).

Since the configuration except the above is approximately similar to that of Embodiment 1-1, the overlapped description will be omitted while the same reference numerals are attached to the same members.

In the embodiment, the heat transfer member 41 is in contact with the long side surface 19 as well as is in contact with the cooling member 42. Accordingly, the heat generated in the power generating element 12 upon charge or discharge is transferred from the long side surface 19 having a relatively large area to the cooling member 42 through the heat transfer member 41. The long side surface 19 of the case 11 is a surface having the largest area in the case 11. Since the long side surface 19 is the surface having the largest area in the case 11, it is possible to cool the power generating element 12 efficiently.

As described above, the long side surface 19 is the surface having the largest area in the case 11 and accordingly is most susceptible to deformation, if the case 11 expands due to an increase in the internal pressure. Considering the above point, the long side surface 19 is configured to be in contact with the heat transfer member 41 capable of deforming elastically in the embodiment. Hence, even if the long side surface 19 deforms, the heat transfer member 41 deforms elastically to follow the deformation of the long side surface 19. As a result, the long side surface 19 and the heat transfer member 41 are held in contact with each other; accordingly, it is possible to inhibit the temperature of the cell 10 from becoming high locally.

Embodiment 1-4

Next, a description will be given of Embodiment 1-4 of the present invention with reference to FIGS. 11 and 12. As shown in FIG. 12, an assembled battery (electric storage apparatus) 56 according to the embodiment is formed by arranging a plurality of cells 10 to be electrically connected. The cells 10 are connected in series or in parallel. The plurality of cells 10 is fixed in an arranged state by a known method such as a band.

Figure 11:
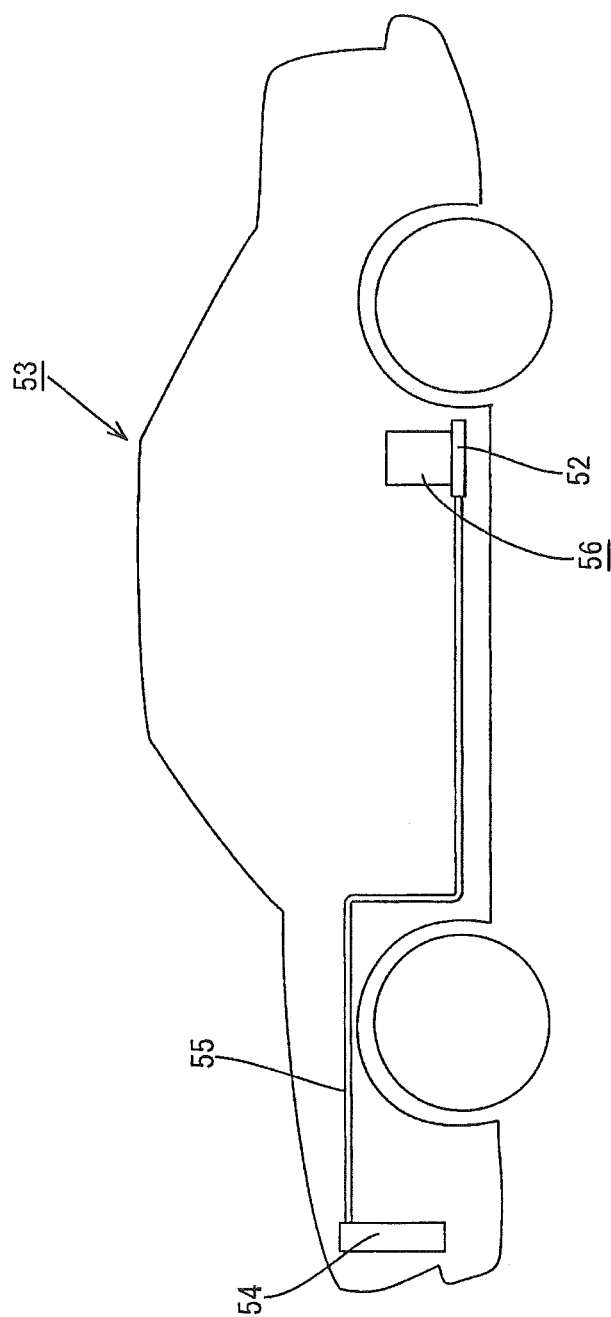
FIG. 11 is a schematic view illustrating a state where an assembled battery according to Embodiment 1-4 of the present invention is installed on a vehicle.
Figure 12:
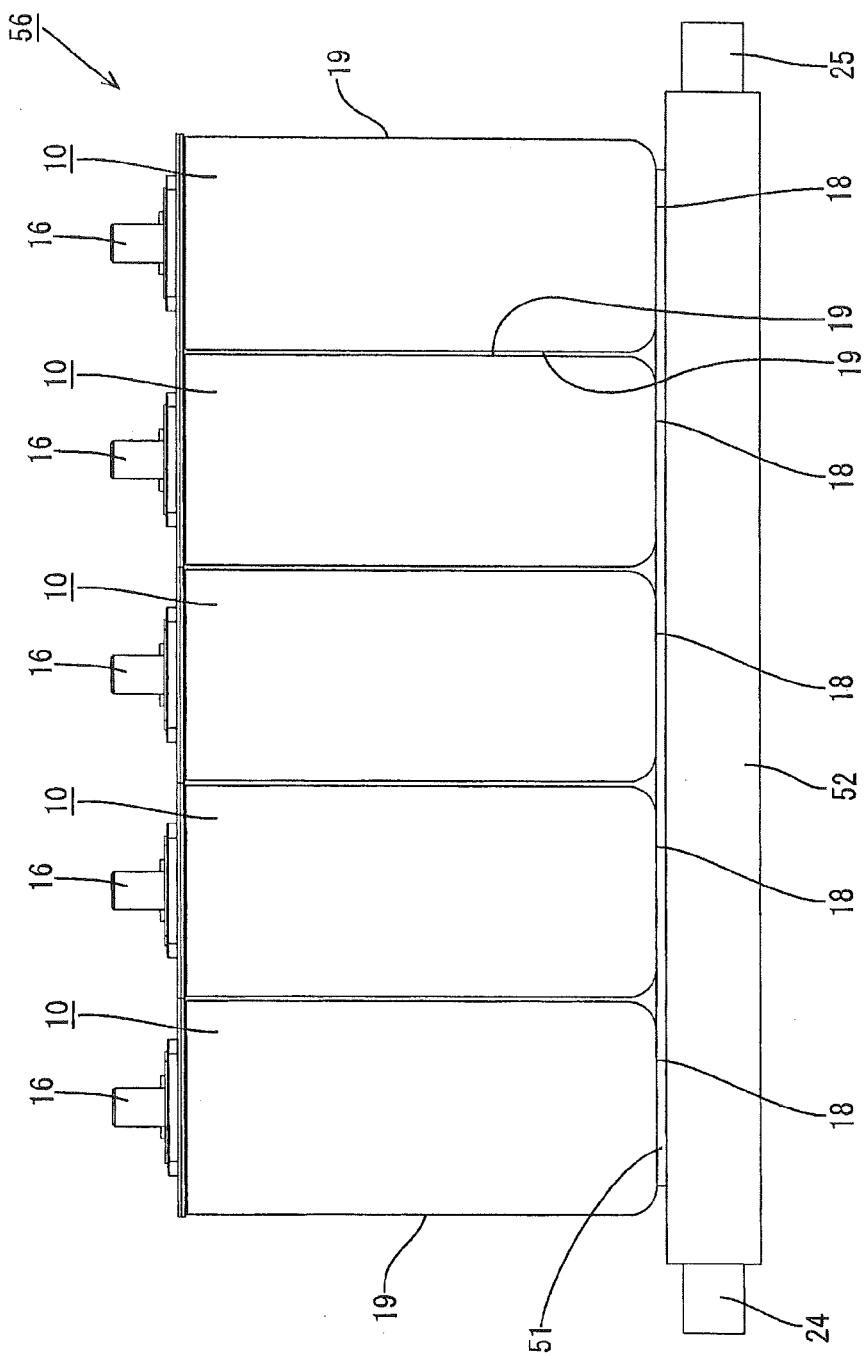
FIG. 12 is a side view illustrating the assembled battery.

Moreover, as shown in FIG. 11, the assembled battery 56 according to the embodiment is installed on a vehicle 53 such as an electric vehicle or a hybrid vehicle to be used as a power source. A radiator 54 is placed in the vehicle 53. The radiator 54 and a cooling member 52 are connected by a pipe 55. A radiator coolant (not shown) circulates in the radiator 54, the pipe 55, and the cooling member 52. An arbitrary liquid such as water, antifreeze including ethylene glycol, or a mixture of water and antifreeze can be used as a radiator coolant as necessary.

As shown in FIG. 12, the assembled battery 56 is formed by arranging the plurality of cells 10 in a position that the long side surfaces 19 thereof are opposed to one another. The plurality of cells 10 are placed on a top surface of one cooling member 52 via one heat transfer member 51.

Since the configuration of the cell 10 except the above is approximately similar to that of Embodiment 1-1, the overlapped description will be omitted while the same reference numerals are attached to the same members.

According to the embodiment, there is no need to separately prepare a coolant to be circulated in the cooling member 52 since a radiator coolant used for the vehicle 53 can be used as a coolant.

The plurality of cells 10 are configured to be placed on the top surface of one heat transfer member 51 in the embodiment; however, the cells 10 may be configured to be placed on the top surfaces of the heat transfer members 51, respectively.

Embodiment 1-5

Figure 13:
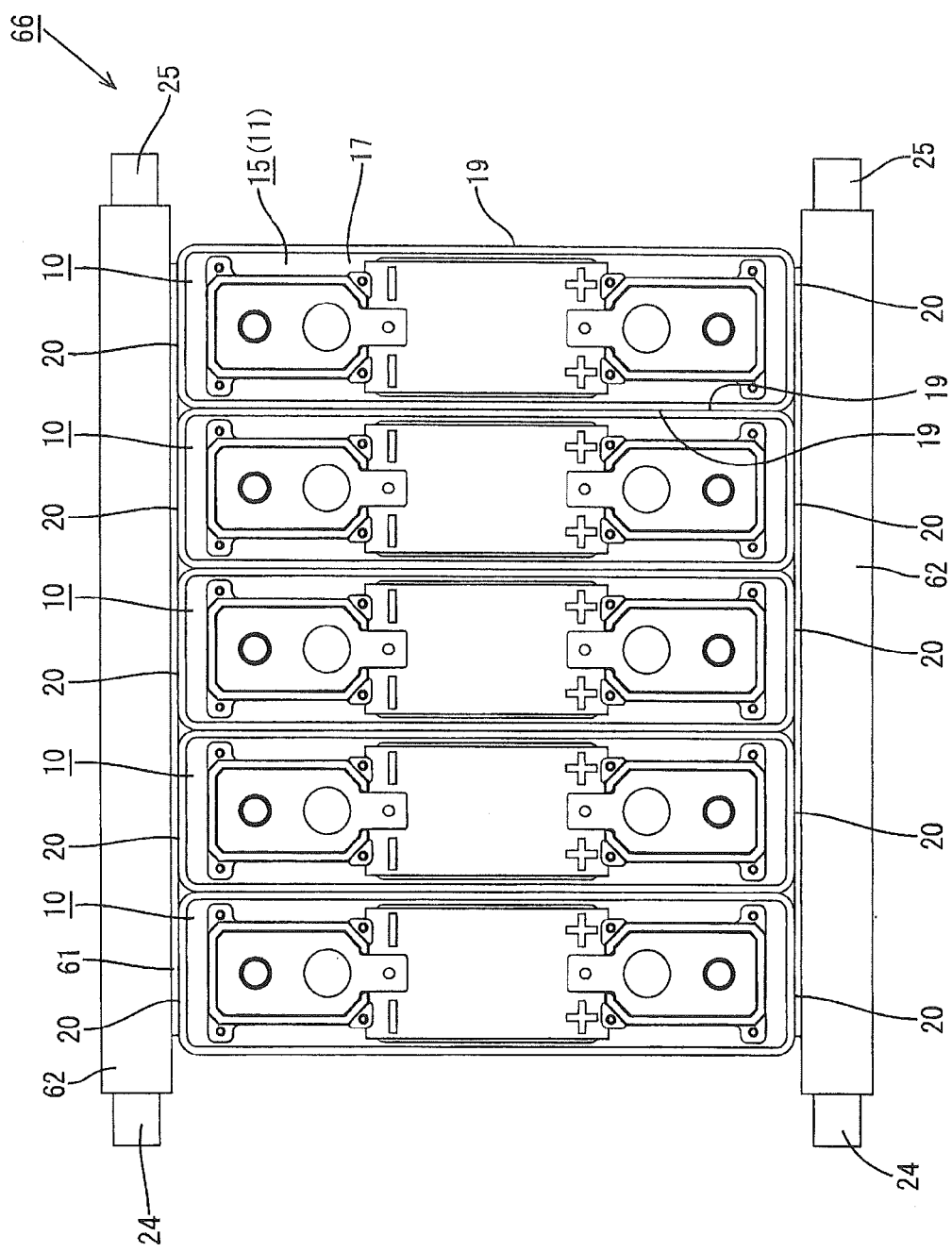
FIG. 13 is a plan view illustrating an assembled battery according to Embodiment 1-5 of the present invention.

Next, a description will be given of Embodiment 1-5 of the present invention with reference to FIG. 13. As shown in FIG. 13, an assembled battery 66 according to the embodiment is formed by arranging a plurality of cells 10 in a position that the long side surfaces 19 thereof are opposed to one another. The plurality of cells 10 are sandwiched between a pair of heat transfer members 61 and 61. The heat transfer members 61 are in contact with the short side surfaces 20 of the cells 10.

Cooling members 62 are placed on surfaces of the heat transfer members 21 opposite to the cells 10, respectively. The plurality of cells 10 as a whole is sandwiched between the pair of cooling members 62 and 62 via the pair of heat transfer members 61 and 61.

Since the configuration except the above is approximately similar to that of Embodiment 1-4, the overlapped description will be omitted while the same reference numerals are attached to the same members.

Experimental Example

Next, a description will be given of an experimental example showing the cooling effect of the cell according to the embodiment. In the embodiment, LEV50 (battery capacity: 50 Ah) manufactured by Lithium Energy Japan was used as a cell.

(Battery 1A)

A battery where a heat transfer member was placed on a bottom surface of a cell and a cooling member was placed on a bottom surface of the heat transfer member was used as a battery 1A. 5580H (thickness: 1.0 mm, thermal conductivity: 3 W/m·K) manufactured by Sumitomo 3M Limited was used as a heat transfer member. A cooling member made of copper was used. Water was used as a coolant.

(Battery 1B)

A battery where a heat transfer member was placed on a long side surface of a cell and a cooling member was placed on a surface of the heat transfer member opposite to a case was used as a battery 1B. The other configurations were set to be the same as the battery 1A.

Comparative Example

A battery where neither a heat transfer member nor a cooling member was placed for a cell was used for a comparative example.

Experimental Procedure

An experiment was carried out at an ambient temperature of 40° C. for the cell 1A, the cell 1B and the comparative example. Water at a temperature of 35° C. and a velocity of 2.5 L/min was circulated in the cooling member as a coolant for the cell 1A and the cell 1B. Cooling by the cooling member was not performed for the comparative example.

Charge and discharge cycles were repeated to measure variations in the temperature of the outer surface of the case for the cell 1A, the cell 1B and the comparative example. The temperature of the outer surface of the case was measured by a thermocouple attached the long side surface of the case. The thermocouple was attached to approximately the center of the long side surface of the case (in proximity to the intersection point of the diagonal lines).

Figure 14:
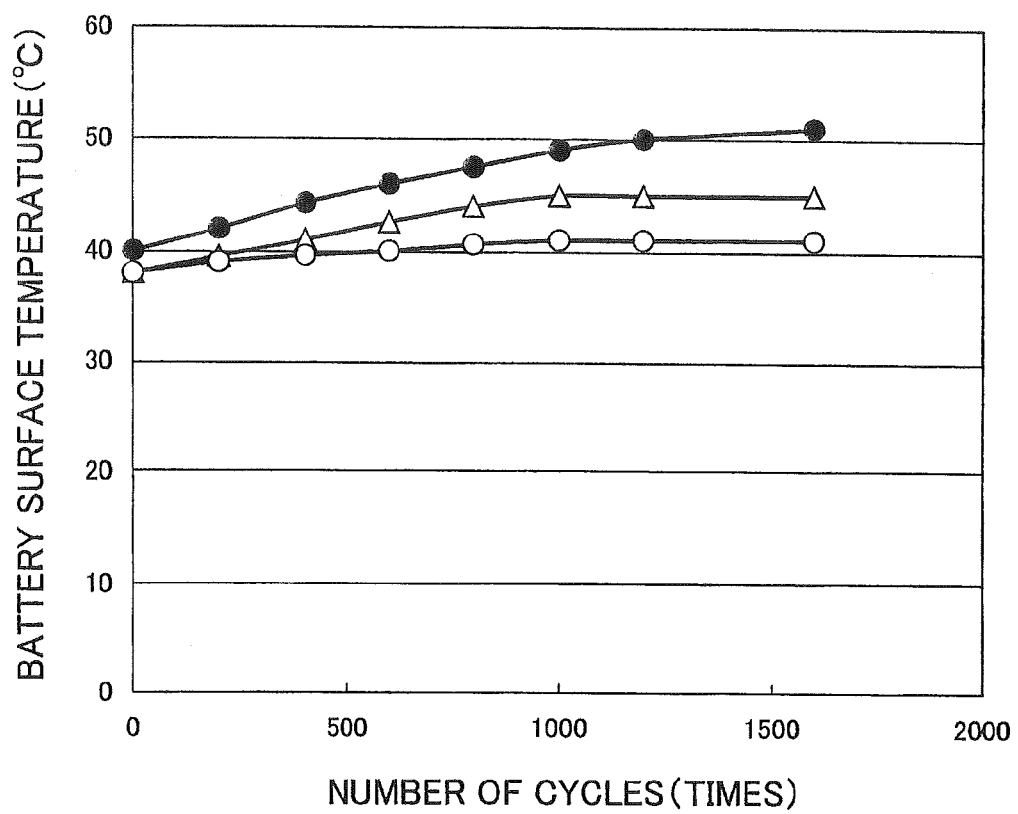
FIG. 14 is a view illustrating a relationship between the number of charge and discharge cycles and surface temperature of a cell.

Charge and discharge of the battery 1A, the battery 1B and the comparative example were carried out in the following conditions. In terms of charge and discharge, the battery 1A, the battery 1B and the comparative example were charged and discharged to the maximum of the rated capacity. In terms of charge, a constant current was set to 1 CA, a constant voltage to 4.1 V, and a charge time to 4 hours. In terms of discharge, a constant current was set to 1 CA and a cut-off voltage of discharge to 2.75 V. These are set to be one cycle. The above cycle was repeated to measure the temperatures of the outer surfaces of the cases of the battery 1A, the battery 1B and the comparative example at a predetermined number of cycles. The results are shown in Table 1 and FIG. 14.

TABLE 1

| Number of Cycles | Comparative Example Not cooled | Battery 1A bottom surface water-cooled with heat transfer member | Battery 1B long side surface water-cooled with heat transfer member |
| --- | --- | --- | --- |
| 0 | 40 | 38 | 38 |
| 200 | 42 | 39 | 40 |
| 400 | 44 | 40 | 41 |
| 600 | 46 | 40 | 43 |
| 800 | 48 | 41 | 44 |
| 1000 | 49 | 41 | 45 |
| 1200 | 50 | 41 | 45 |
| 1600 | 51 | 41 | 45 |

On the completion of 200 cycles, the temperature of the outer surface of the case according to the comparative example (represented as ● in FIG. 14) increased to as high as 42° C. while the temperature of the outer surface of the case of the battery 1A (represented in ○ in FIG. 14) increased only to 39° C. and the temperature of the outer surface of the case of the battery 1B (represented in Δ in FIG. 14) increased only to 40° C.

Furthermore, on the completion of 1600 cycles, the temperature of the outer surface of the case according to the comparative example increased to as high as 51° C. while the battery 1A increased only to 41° C. and the battery 1B increased only to 45° C.

In this manner, since the heat transfer member capable of deforming elastically is in contact with the outer surface of the case in the batteries 1A and 1B, the heat transfer member can follow the deformation of the case by deforming elastically even if the case expands with the progress of charge and discharge cycles. Hence, the outer surface of the case and the heat transfer member can be held in contact with each other; accordingly, heat is efficiently transferred from the outer surface of the case to the heat transfer member. As a result, the heat generated in the power generating element upon charge and discharge is transferred from the case to the cooling member through the heat transfer member; accordingly, it is possible to inhibit the temperature of the battery from becoming high locally.

Moreover, since the bottom surface of the case is away from the power generating element housed in the case, it is possible to inhibit the power generating element from pressing the bottom surface of the case even if the power generating element expands with the progress of charge and discharge cycles. Accordingly, the bottom surface of the case is inhibited from expanding, so that the bottom surface of the case is securely in contact with the heat transfer member. As a result, heat is securely transferred from the bottom surface of the case to the heat transfer member; accordingly, it is possible to securely inhibit the temperature of the battery from becoming high locally.

Other Embodiments

The present invention is not limited to the embodiments explained in the above descriptions and with reference to the drawings, but, for example, the following embodiments, too, are included in the technical scope disclosed in the specification.

1-(1) The heat transfer members 21 may be configured to be placed in contact with both of the long side surface 19 of the case 11 and the bottom surface 18 of the case 11. In this case, the cooling members 22 are placed in contact with the heat transfer member 21 placed in contact with the long side surface 19 of the case 11 and the heat transfer member 21 placed in contact with the bottom surface 18 of the case 11, respectively.

Moreover, the heat transfer members 21 may be configured to be placed in contact with both of the short side surface 20 of the case 11 and the bottom surface 18 of the case 11. In this configuration, the cooling members 22 are placed in contact with the heat transfer member 21 placed in contact with the short side surface 20 of the case 11 and the heat transfer member 21 placed in contact with the bottom surface 18 of the case 11, respectively.

Furthermore, the heat transfer members 21 may be configured to be placed in contact with the long side surface 19 of the case 11, the short side surface 20 of the case 11, and the bottom surface 18 of the case 11. In this configuration, the cooling members 22 are placed in contact with the heat transfer members 21 placed in contact with the above surfaces of the case 11, respectively.

1-(2) A liquid is used as a coolant in the embodiments, but a coolant is not limited to this, and may be air.

1-(3) The heat transfer member 21 may be configured to be placed in contact with the terminal surface 17.

1-(4) Among the wall surfaces of the case 11, the wall surface coming into contact with the power generating element 12 housed in the case 11 may be configured to be in contact with the outer surface of the heat transfer member 21.

1-(5) The power generating element 12 is a winding type in the embodiments, but is not limited to this. The power generating element 12 may be a stack type formed by laminating a positive plate, a separator and a negative plate.

Figure 15:
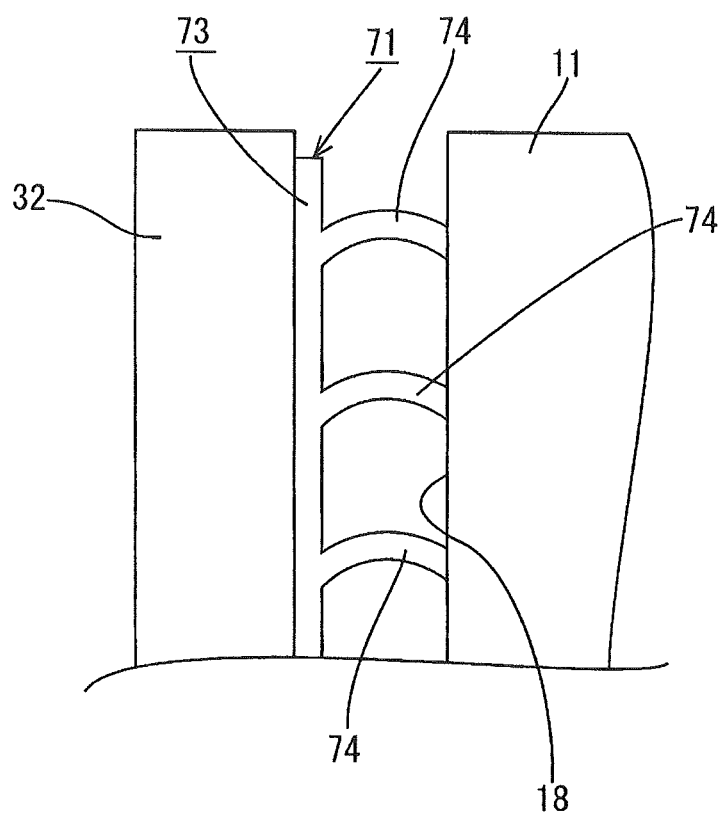
FIG. 15 is an enlarged view of an important part illustrating a cell according to another Embodiment 1-6.

1-(6) The heat transfer member 31 is configured to form a sheet shape in Embodiment 1-2, but is not limited to this. As shown in FIG. 15, a heat transfer member 71 may be configured to include an elastically deforming portion 74 capable of deforming elastically, the portion protruding from a base 73. The heat transfer member 71 may be configured to bring the outer surface of the case 11 into contact with the base 73 and ends of the elastically deforming portion 74 into contact with the outer surface of the cooling member 32. The elastically deforming member 74 is in contact with the outer surface of the cooling member 32 in an elastically deformed state. Accordingly, even if the case 11 expands, the elastically deforming portion 74 deforms elastically to follow the deformation of the case 11. Moreover, the heat transfer member 71 may be configured to bring the outer surface of the cooling member 32 into contact with the base 73 and the ends of the elastically deforming portion 74 into contact with the outer surface of the case 11.

1-(7) The battery module is not limited to the configuration of being installed on the vehicle 53, but may be installed on an arbitrary conveyance such as a ship or an aircraft as necessary to be used as a power source therefor. Moreover, the battery module can be used as a power source of an arbitrary apparatus such as an emergency power source as necessary.

1-(8) The cooling member is configured to include a coolant to be circulated therein in the embodiments, but is not necessarily configured to circulate a coolant. A cooling member may be a metal plate provided with a plurality of fins, for example, or may be a metal plate having a flat surface.

1-(9) An electric storage device is a cell capable of charging and discharging in the embodiments, but is not limited to this and may be a capacitor such as an electrochemical capacitor or an electric double layer capacitor.

1-(10) The configuration where the inner surface of the wall of the case is away from the electric storage element includes a configuration where a gap is formed between the inner surface of the wall of the case and the electric storage element, and also includes a configuration where the case is not in direct contact with the electric storage element by positioning a buffer material between the inner surface of the wall of the case and the electric storage element.

Embodiment 2-1

Background Art

An assembled battery formed by arranging a plurality of cells is installed on an electric vehicle or the like. Circulating cooling air (air) is proposed in JP-A-2000-294302, for example, in order to cool such an assembled battery.

In the assembled battery described in JP-A-2000-294302, battery modules constituting the assembled battery are arranged at intervals as well as a plurality of cells constituting the battery module is arranged at intervals to form a cooling passage.

Summary of the Technology Disclosed in the Specification

Problems to be Solved by the Technology Disclosed in the Specification

In an assembled battery having a cooling passage formed by spacing cells and battery modules similarly to the assembled battery described in JP-A-2000-294302, if the spaces between the cells and the spaces between the battery modules are made larger to improve the cooling efficiency, large space is required to install the assembled battery. On the other hand, if the spaces between the cells and the spaces between the battery modules are made smaller, it becomes difficult for cooling air to circulate and then it becomes difficult to apply cooling air evenly to a plurality of cells constituting the assembled battery; accordingly, variations in the temperatures of the batteries occur. Moreover, there is a problem that since the cells expand due to the use to further reduce the spaces between the cells and the spaces between the battery modules, the circulation of the cooling air becomes worse and the cooling performance decreases.

The technology disclosed in the specification has been completed based on the above situation, and an object thereof is to provide an electric storage apparatus that is space saving and is superior in cooling performance.

Solutions to the Problems

The technology disclosed in the specification to solve the above problems is an electric storage device including an electric storage element, a case where the electric storage element is housed and electrode terminals are formed to be protruded, and a cooling member placed outside the case for cooling the case. The cooling member is placed in direct or indirect contact with a surface other than a surface having the largest area among surfaces of the case except a terminal surface on which the electrode terminals are formed. Moreover, the technology disclosed in the specification is an electric storage apparatus formed by arranging a plurality of the electric storage devices.

Since the cooling member is placed in direct or indirect contact with a surface of the case in the technology disclosed in the specification, unlikely to the configuration where a cooling passage is formed by spacing the electric storage devices, there is no need to widen the spaces to improve the cooling efficiency. Therefore, it is space saving.

The electric storage devices constituting the electric storage apparatus expand due to the expansion of the electric storage element and an increase in the internal pressure of the battery. Accordingly, if the electric storage devices expand after the cooling member is placed in direct or indirect contact with a surface of the flat square case, for example, and then contact areas of the surface of the case and the cooling member are reduced, the cooling effect by the cooling member cannot be fully obtained. Therefore, the cooling effect for the electric storage devices decreases. Moreover, if the electric storage devices are assembled to the electric storage apparatus, the temperature distribution in the electric storage apparatus may become uneven.

A surface having the largest area among surfaces of the case of the electric storage device is the most expandable surface when the electric storage device expands; accordingly, it is feared that if the cooling member is placed only on this surface, the contact area with the cooling member becomes smaller and therefore the cooling effect by the cooling member cannot be fully obtained.

However, in the technology disclosed in the specification, the cooling member is placed in direct or indirect contact with a surface other than the surface having the largest area among the surfaces of the case and accordingly is placed in contact with a surface that resists expansion. In other words, in the technology disclosed in the specification, even if the electric storage device itself expands, the cooling member is placed in contact with a surface of the case, the surface resisting expansion; accordingly, it is possible to enlarge the contact area of the cooling member and the surface of the case and fully obtain the cooling effect by the cooling member. As a result, according to the technology disclosed in the specification, it is possible to improve the cooling performance of the electric storage apparatus.

The technology disclosed in the specification may be configured as follows: The cooling member may be a member circulating a coolant to cool the battery case.

The coolant may be a radiator coolant of a vehicle. Such a configuration enables the use of a radiator coolant as a coolant if the electric storage apparatus using the electric storage devices according to the technology disclosed in the specification is installed on a vehicle provided with a radiator. There is no need to separately prepare a coolant to be circulated in the cooling member if a radiator coolant used for a vehicle can be used. The radiator coolant can include antifreeze such as ethylene glycol.

A thermally conductive member made of material having higher thermal conductivity than air and capable of deforming elastically may be placed between the cooling member and the case.

If the use of the electric storage device results in the deformation of the surface of the case on which the cooling member is placed, the contact area of the case and the cooling member is reduced. Thus, it is feared that the cooling effect decreases.

Hence, the above configuration enables the thermally conductive member to deform following the deformation of the case; accordingly, even if the case deforms due to the long use of the electric storage device, it is possible to maintain the large contact area of the case and the cooling member and therefore it is possible to prevent a decrease in cooling effect.

The thermally conductive member may have insulating properties. For example, if the case of the electric storage device is made of metal and the thermally conductive member is made of non-insulated material, there is a concern for safety such as corrosion caused by continuity between the case and the thermally conductive member. However, even if the case of the electric storage device is made of metal, the above configuration makes it possible to increase safety since there is no continuity between the case and the thermally conductive member.

The electric storage apparatus according to the technology disclosed in the specification may be configured as follows: One cooling member may be provided for two or more electric storage devices. Such a configuration makes it possible to reduce the number of parts and save space.

The electric storage apparatus may be configured to provide one heat transfer member for two or more electric storage devices. Such a configuration makes it possible to reduce the number of parts and save space.

Effect of the Technology Disclosed in the Specification

According to the technology disclosed in the specification, it is possible to provide an electric storage apparatus that is space saving and is superior in cooling performance.

A description will be given of a cell (electric storage device) 110 of Embodiment 2-1 of the present invention with reference to FIGS. 16 to 20.

Figure 16:
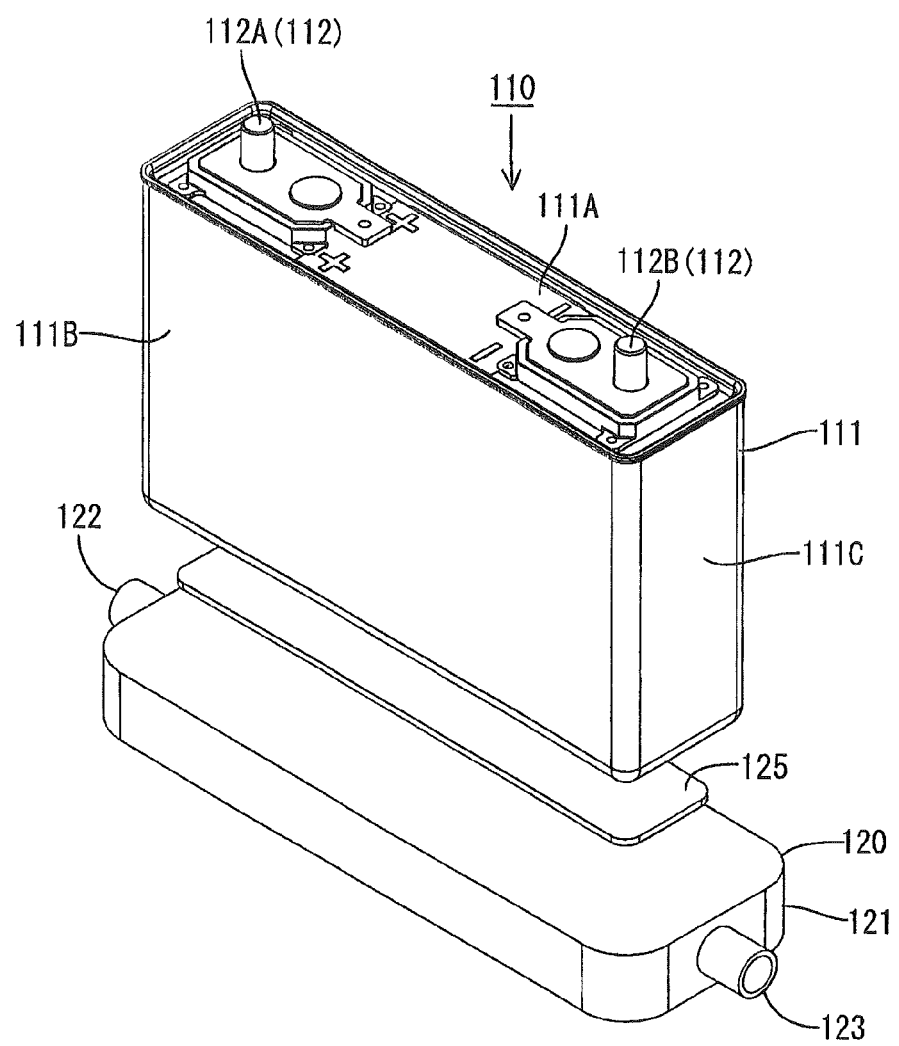
FIG. 16 is a perspective view of a cell of Embodiment 2-1.

As shown in FIG. 16, the cell 110 of the embodiment includes a cuboid (an example of a flat and square shape) battery case (case) 111, a thermally conductive member (heat transfer member) 125 placed beneath the battery case 111, and a cooling member 120.

Figure 17:
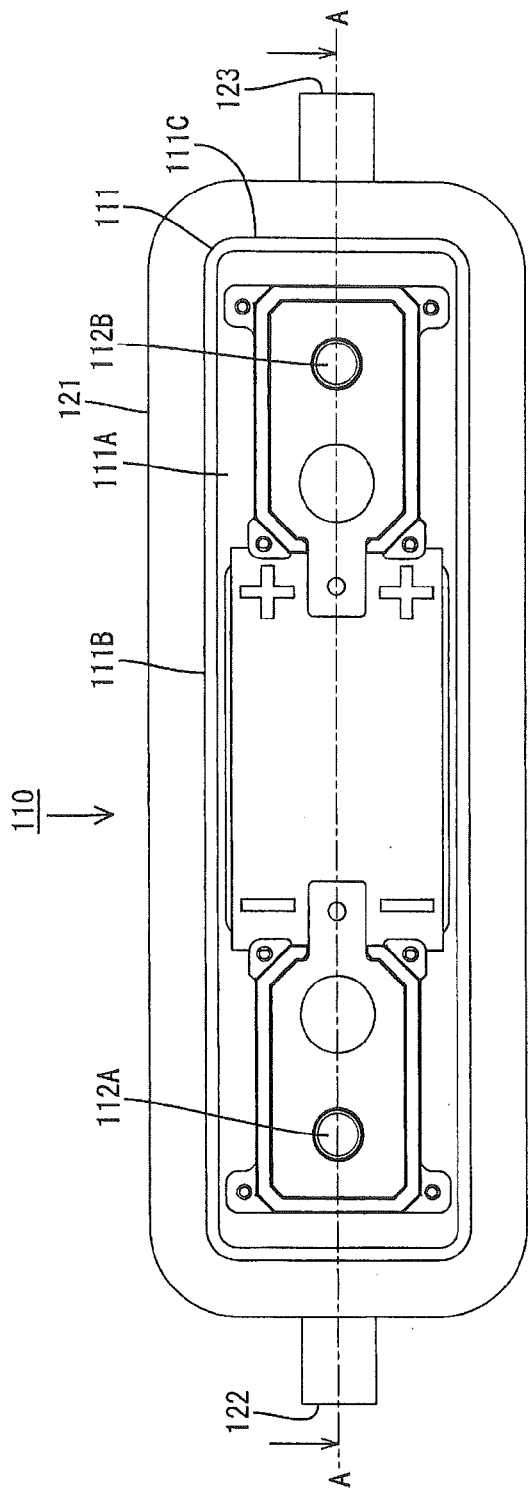
FIG. 17 is a top view of the cell.
Figure 18:
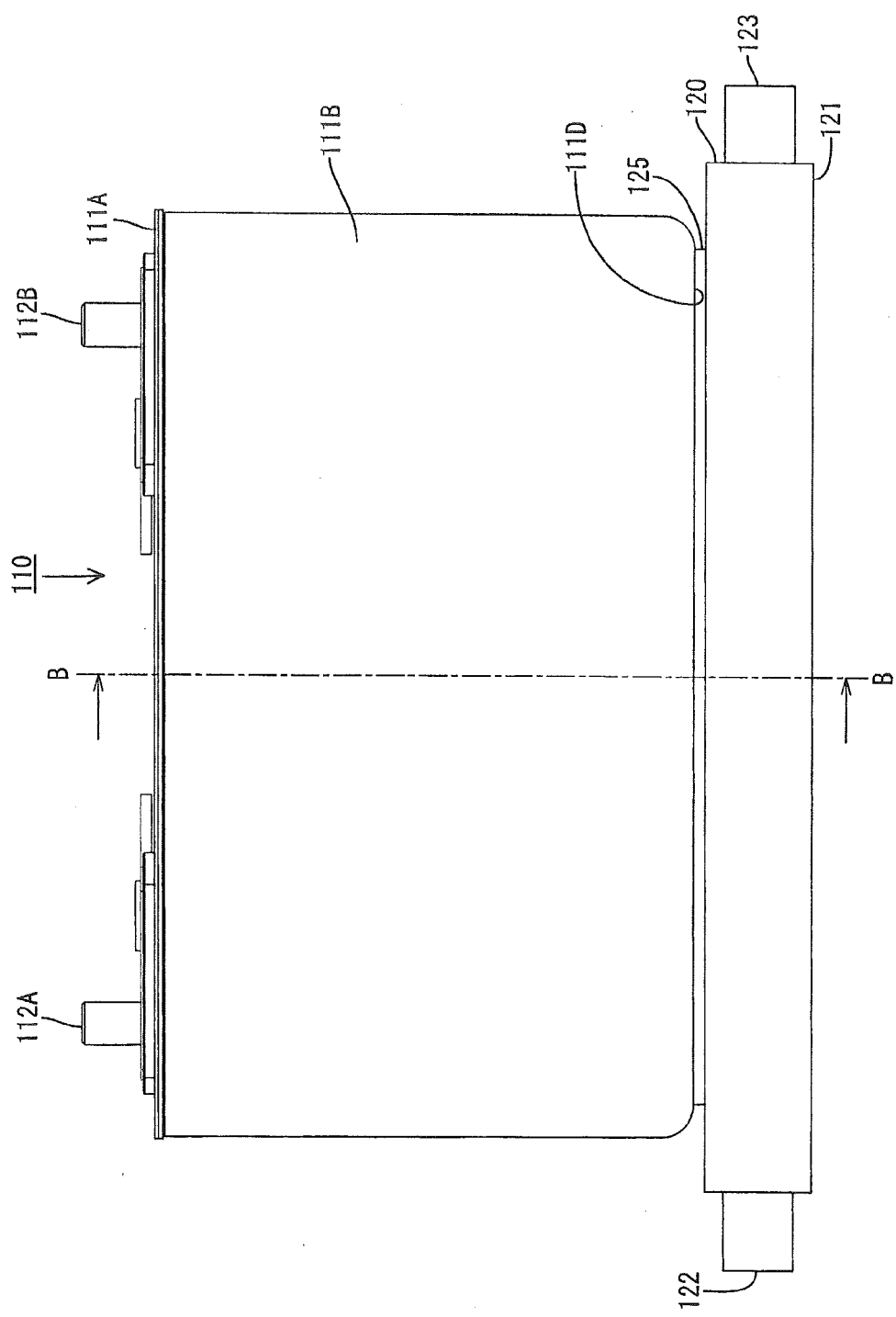
FIG. 18 is a side view of the cell.

As shown in FIGS. 16 and 17, a top surface 111A of the battery case 111 is a terminal surface 111A formed by protruding a positive terminal 112A and a negative terminal 112B (electrode terminals 112). As shown in FIGS. 16 and 18, side surfaces 111B and 111C of the battery case 111 are configured of a surface having a large area 111B (also referred to as the "long side surface 111B") and a surface having a small area 111C (also referred to as the "short side surface 111C"). The cooling member 120 is placed on an undersurface 111D of the battery case 111. The undersurface 111D of the case 111 is set to be the bottom surface 111D. The terminal surface 111A, the long side surface 111B, the short side surface 111C and the bottom surface 111D constitute a plurality of walls of the battery case 111.

Figure 19:
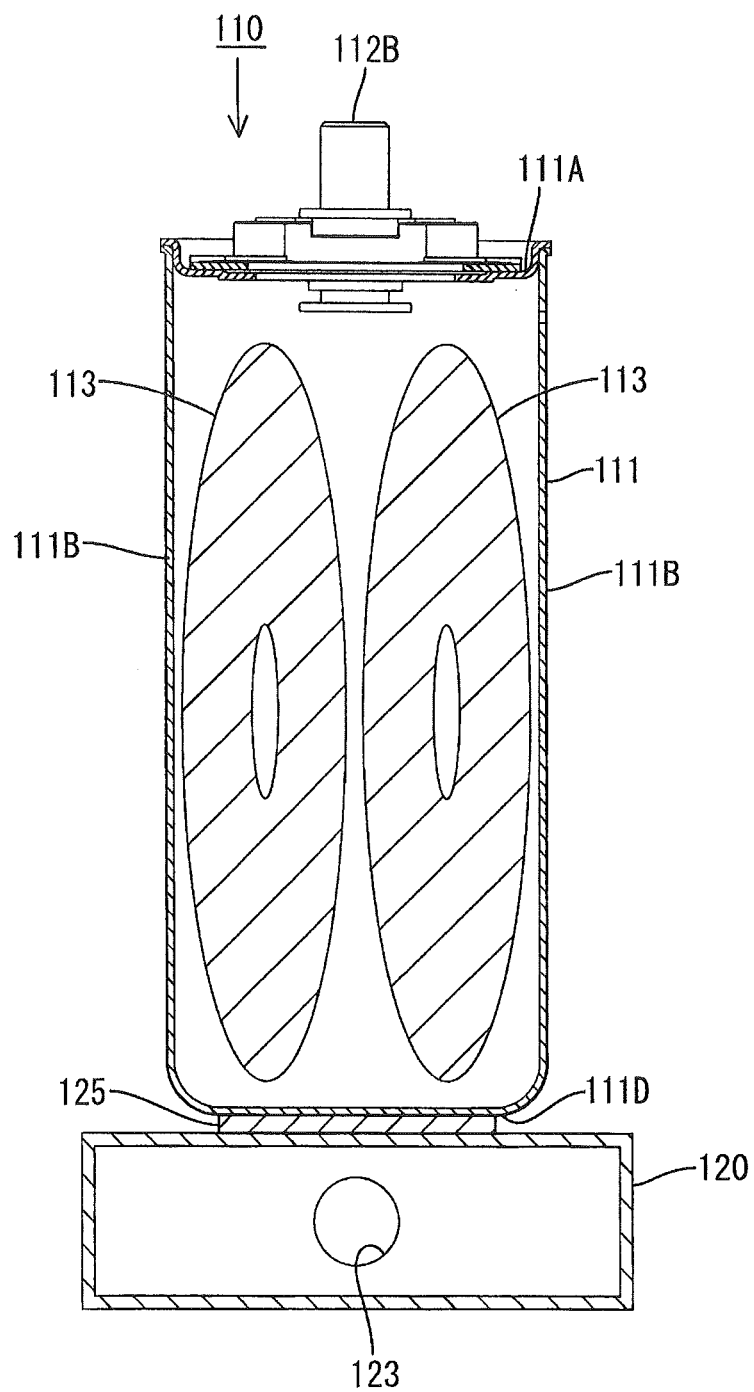
FIG. 19 is a cross-sectional view taken along line B-B in FIG. 18.

In the embodiment, the battery case 111 is made of metal such as stainless, and houses power generating elements (electric storage elements) 113 therein as shown in FIG. 19. Although the details are not illustrated, the power generating element 113 is formed by winding a positive plate and a negative plate via a separator. In the embodiment, two power generating elements 113 and 113 are housed by orienting the winding axes in a direction perpendicular to the short side surface 111C. The positive plate is connected to the positive terminal 112A, and the negative plate is connected to the negative terminal 112B.

In the embodiment, among the surfaces of the battery case 111, a surface having the longest distance apart from the power generating element 113 is the short side surface 111C, and a surface having the shortest distance apart from the power generating element 113 is the long side surface 111B. Among the surfaces of the battery case 111, a surface having the largest area is the long side surface 111B, and a surface having the smallest area is the short side surface 111C.

As shown in FIG. 18, the cooling member 120 placed beneath the bottom surface 111D of the battery case 111 includes a body portion 121 made of metal for housing an unillustrated coolant therein and circulating the coolant, a coolant inlet port 122 provided at an end portion on the left shown in FIG. 18 of the body portion 121 for introducing the coolant in the body portion 121, and a coolant outlet port 123 provided at an end portion on the right shown in FIG. 18 of the body portion 121 for draining the coolant in the body portion 121 out of the body portion 121.

A radiator coolant for a vehicle, water, air, or the like can be cited as a coolant to be circulated in the body portion 121 of the cooling member 120. Ethylene glycol or the like can be cited as a specific example of a radiator coolant. Water and a radiator coolant are preferable among these coolants in the respect that they are not dependent on the outdoor temperature.

Figure 20:
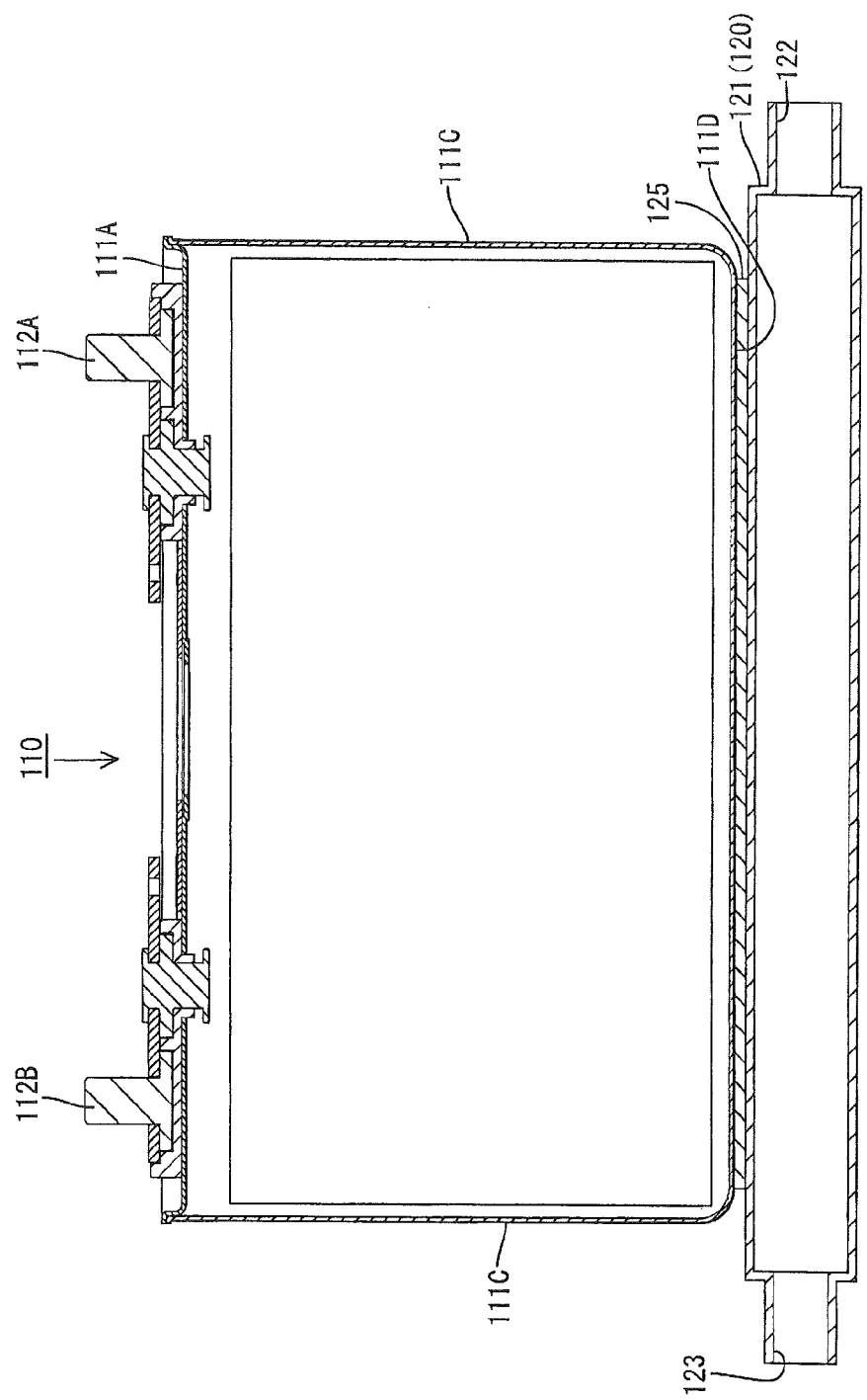
FIG. 20 is a cross-sectional view taken along line A-A in FIG. 17.

As shown in FIGS. 18 and 20, the sheet-shaped thermally conductive member (heat transfer member) 125 is held between the cooling member 120 and the bottom surface 111D of the battery case 111. Specifically, a top surface of the thermally conductive member 125 is placed in direct contact with the bottom surface 111D of the battery case 111, and an undersurface of the thermally conductive member 125 is placed in direct contact with a top surface of the body portion 121 of the cooling member 120.

Cited as thermally conductive material forming the thermally conductive member 125 is material having higher thermal conductivity than air and capable of deforming elastically following the expansion of the battery.

If the battery case 111 of the cell 110 is made of metal and the thermally conductive member 125 is made of non-insulated material such as metal, there is a concern for safety such as the corrosion of the battery case 111 caused by continuity between the battery case 111 and the thermally conductive member 125. Considering safety, insulating material is preferable as thermally conductive material. Polyamide resin, acrylic resin or the like can be cited as a specific example of such thermally conductive material.

Next, a description will be given of the operation and effect of the embodiment.

According to the embodiment, since the cooling member 120 is placed in indirect contact with the bottom surface 111D of the battery case 111 via the thermally conductive material, unlikely to the configuration where a cooling passage is formed by spacing the cells 110, there is no need to widen the spaces to improve the cooling efficiency. Therefore, it is space saving.

In the embodiment, among the surfaces of the battery case 111, having the longest distance apart from the power generating element 113, the short side surface 111C has less influence of the expansion of the power generating element 113. However, the short side surface 111C has the smallest area; accordingly, the cooling efficiency is low. The bottom surface 111D of the battery case 111 has a slightly shorter distance apart from the power generating element 113 than the short side surface 111C; however, the bottom surface 111D has a larger area than the short side surface 111C, and has a smaller area than the long side surface 111B. Accordingly, even if the power generating element 113 expands or the internal pressure of the battery increases, the bottom surface 111D resists expansion and cooling efficiency thereof is higher than that of the short side surface 111C. Therefore, in the embodiment, even if the cell 110 itself expands, the cooling member 120 is placed on the surface that resists expansion (bottom surface 111D) among the surfaces of the battery case 111; accordingly, it is possible to enlarge the contact area of the cooling member 120 and the battery case 111. As a result, it is possible to improve the cooling performance of an assembled battery (electric storage apparatus) using the cell 110 of the embodiment.

If the use of the cell 110 results in the deformation of the surface of the battery case 111 on which the cooling member 120 is placed, the contact area of the battery case 111 and the cooling member 120 is reduced. Therefore, it is feared that the cooling effect decreases. However, in the embodiment, the thermally conductive member 125 made of material having higher thermal conductivity than air and capable of deforming elastically is placed between the cooling member 120 and the battery case 111; accordingly, since the thermally conductive member 125 deforms following the deformation of the battery case 111, even if the battery case 111 deforms due to the long use of the cell 110, it is possible to maintain the large contact area of the battery case 111 and the cooling member 120. Therefore it is possible to prevent a decrease in cooling effect.

<Variation 2-1>

A description will be given of a variation of Embodiment 2-1 with reference to FIGS. 21 to 25.

Figure 21:
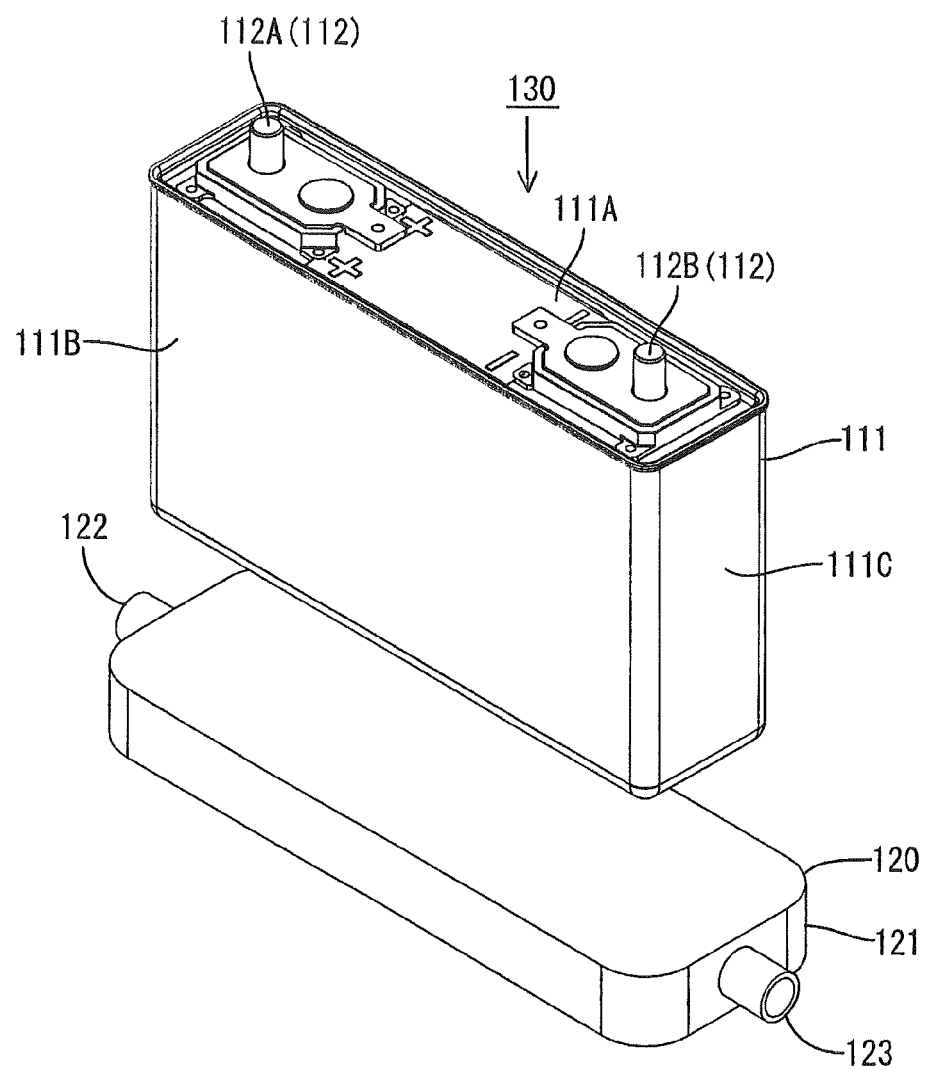
FIG. 21 is a perspective view of a cell of Variation 2-1.
Figure 22:
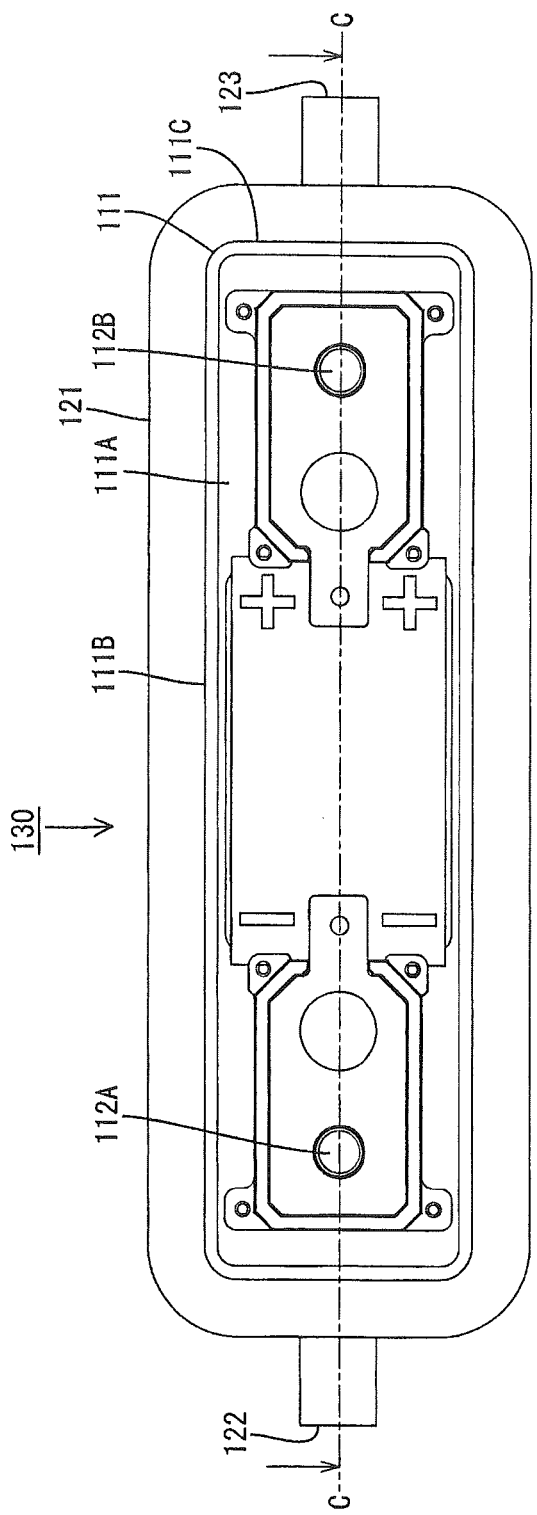
FIG. 22 is a top view of the cell.

As shown in FIG. 21, a cell 130 of Variation 2-1 is different from that of Embodiment 2-1 in the respect that the thermally conductive member 125 is not provided between the battery case 111 and the cooling member 120. In this variation, the same reference numerals are attached to similar configurations to those in Embodiment 2-1, and the overlapped description will be omitted.

Figure 23:
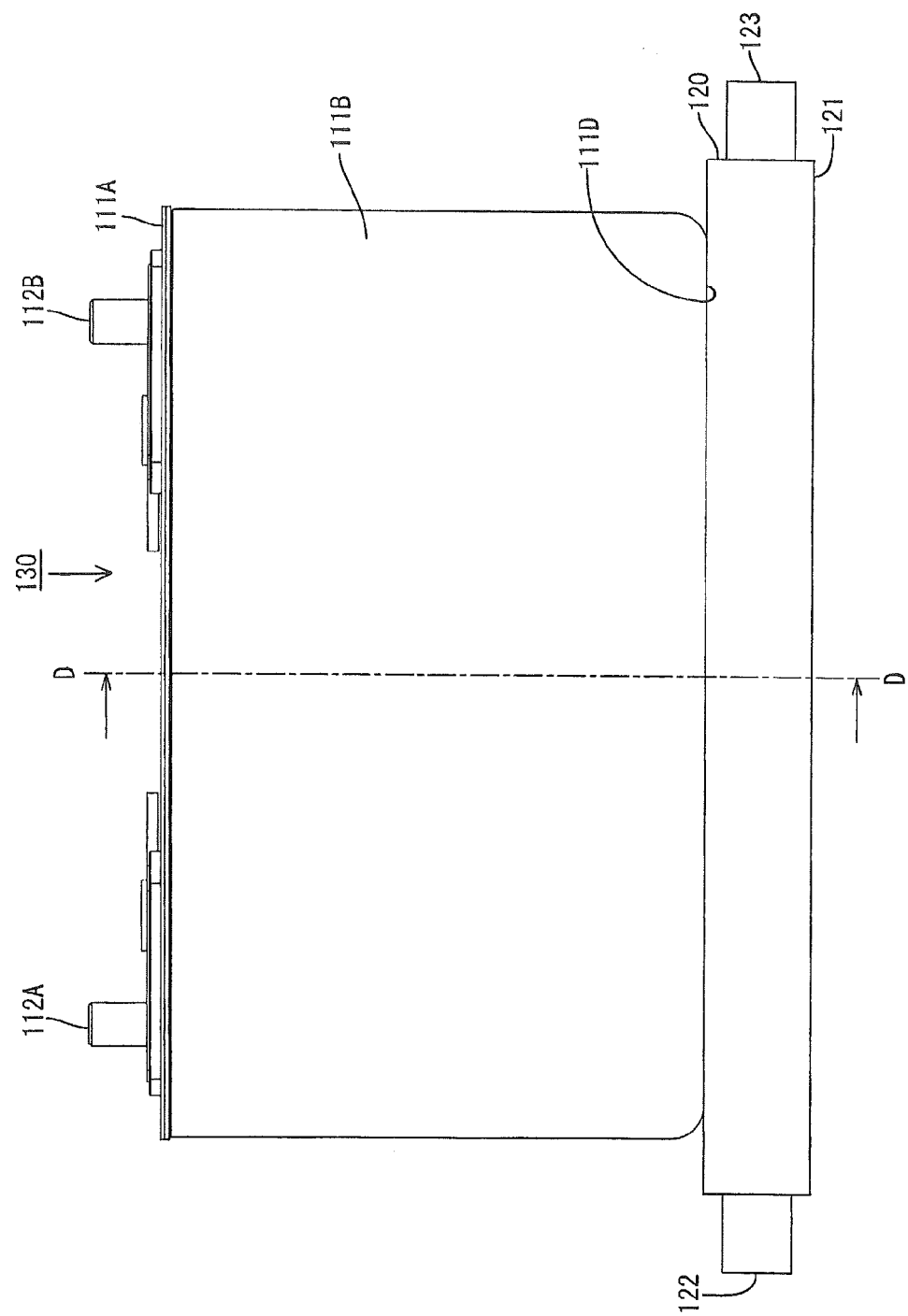
FIG. 23 is a side view of the cell.
Figure 24:
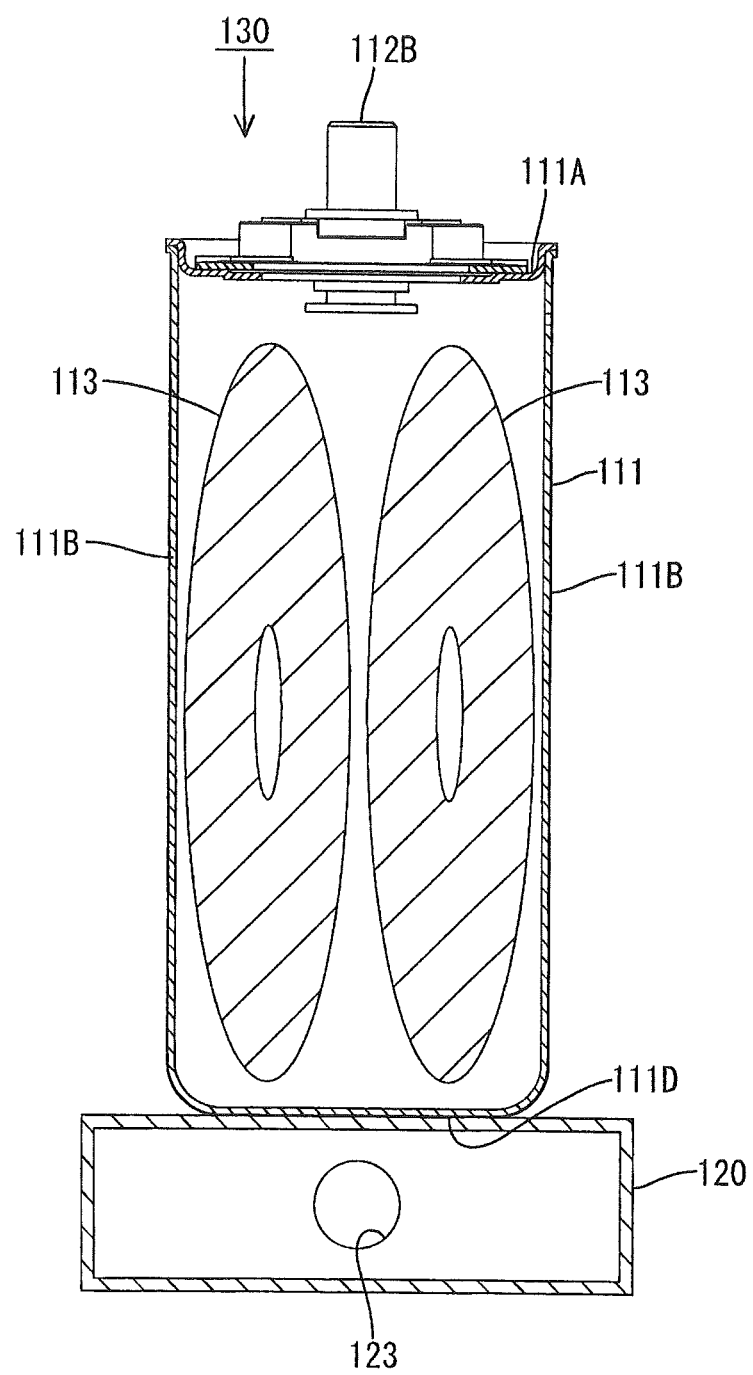
FIG. 24 is a cross-sectional view taken along line D-D in FIG. 23.
Figure 25:
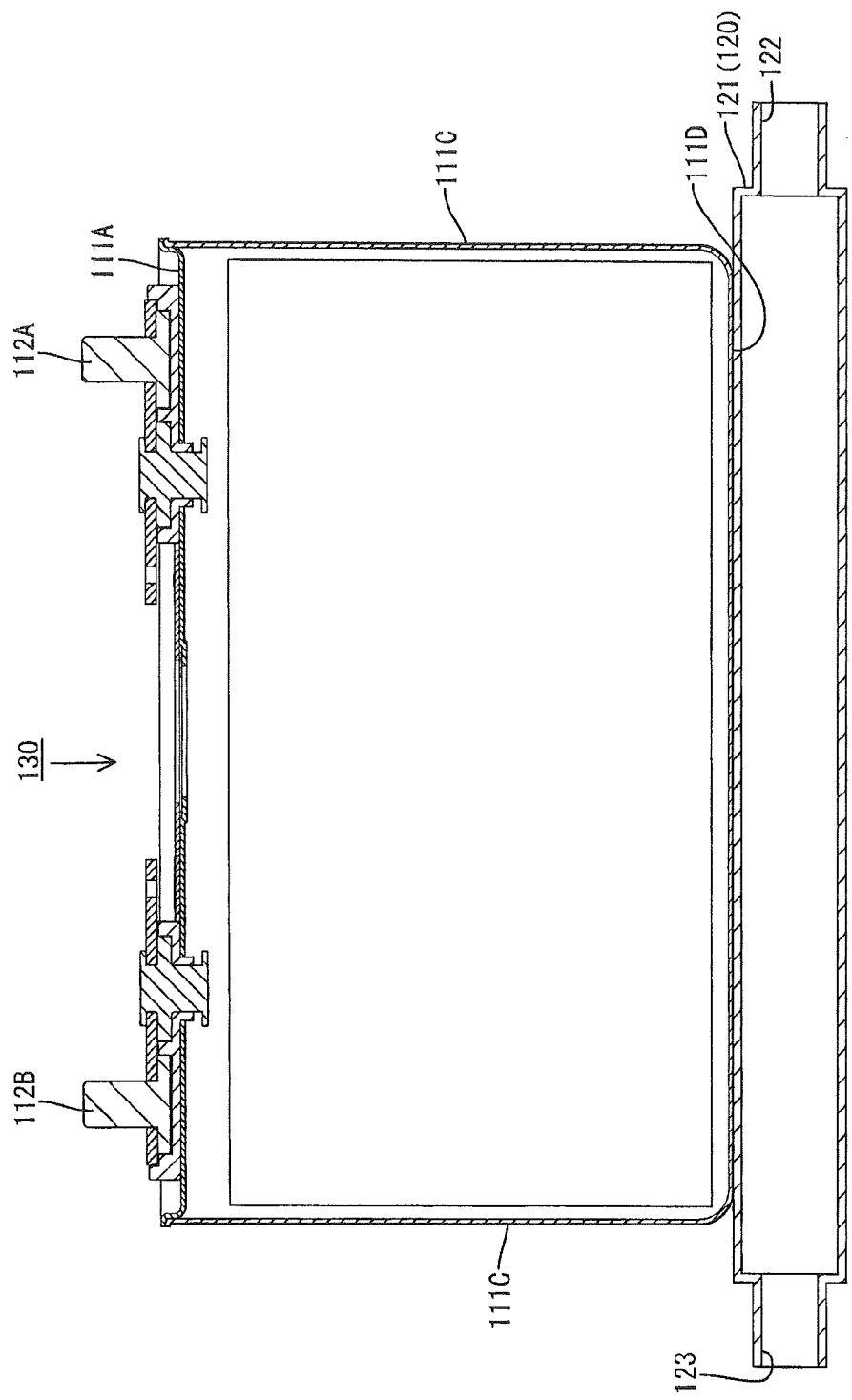
FIG. 25 is a cross-sectional view taken along line C-C in FIG. 22.

As shown in FIGS. 23 to 25, in the cell 130 of Variation 2-1, the cooling member 120 is placed in direct contact with the bottom surface 111D of the battery case 111. In the variation, the configuration other than the above is approximately the same as the cell 110 in Embodiment 2-1 as shown in FIGS. 21 to 25. Therefore, it is possible to provide an assembled battery that is space saving and has improved the cooling performance by the variation, too, similarly to Embodiment 1.

Embodiment 2-2

Figure 26:
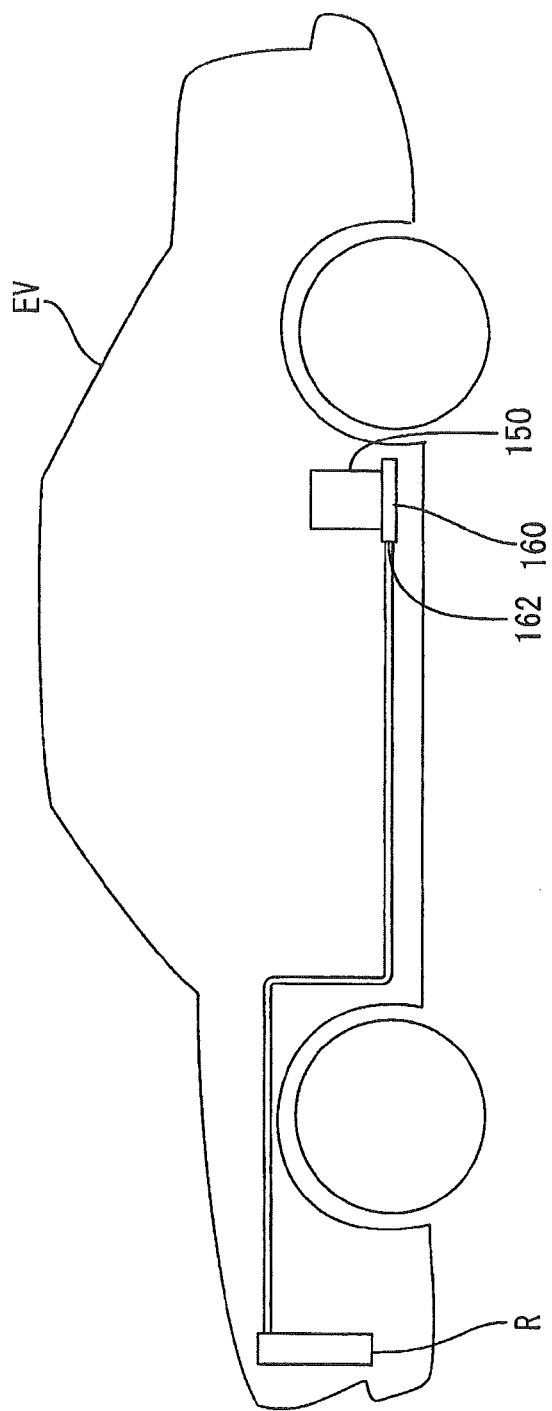
FIG. 26 is a schematic view schematically illustrating a vehicle where an assembled battery of Embodiment 2-2 is installed.

A description will be given of an assembled battery 150 of Embodiment 2-2 with reference to FIGS. 26 and 27. The assembled battery 150 of the embodiment is installed on the rear of an electric vehicle EV as shown in FIG. 26. The embodiment is different from Embodiment 2-1 in the respects that a plurality of cells 140 is provided and that one cooling member 160 and one thermally conductive member 165 are provided for the plurality of cells 140. The same reference numerals are attached to similar configurations to those in Embodiment 2-1, and the overlapped description will be omitted.

Figure 27:
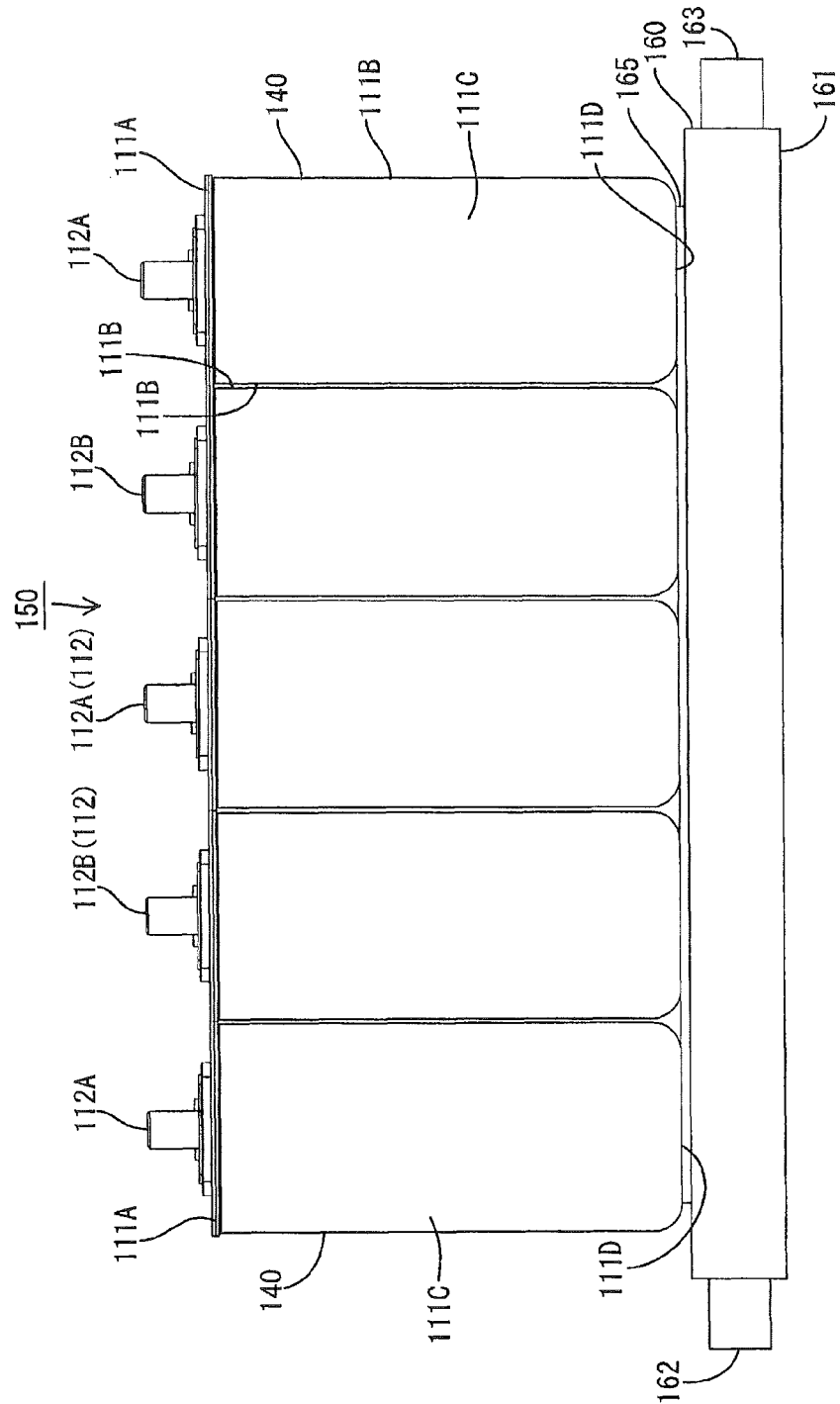
FIG. 27 is a side view of the assembled battery.

As shown in FIG. 27, the assembled battery 150 of the embodiment is formed by arranging a plurality of (five in the embodiment) cells 140 to be opposite to the long side surfaces 111B and 111B. The plurality of cells 140 constituting the assembled battery 150 is designed to be electrically connected by connecting an unillustrated conductive member such as a bus bar. In the embodiment, the cooling member 160 is placed in indirect contact with the bottom surface 111D of the battery case 111 via the sheet-shaped thermally conductive member 165.

The cooling member 160 includes a body portion 161 made of metal for housing an unillustrated coolant therein and circulating the coolant, a coolant inlet port 162 provided at an end portion on the left shown in FIG. 27 of the body portion 161 for introducing the coolant in the body portion 161, and a coolant outlet port 163 provided at an end portion on the right shown in FIG. 27 of the body portion 161 for draining the coolant in the body portion 161 out of the body portion 161. In the embodiment, the coolant inlet port 162 and the coolant outlet port 163 are placed on the long side surface 111B sides of the cell 140.

Additionally, the coolant inlet port 162 and the coolant outlet port 163 are connected with a radiator R as shown in FIG. 26. In the embodiment, a coolant circulated in the body portion 161 of the cooling member 160 is a radiator coolant for a vehicle. The configuration other than the above is approximately similar to that of Embodiment 2-1.

Next, a description will be given of the operation and effect of the embodiment.

According to the embodiment, similarly to Embodiment 2-1, the cooling member 160 is placed, via the thermally conductive member 165, in indirect contact with the bottom surface 111D being a surface resisting expansion and having higher cooling efficiency than the short side surface 111C among the surfaces of the battery case 111; accordingly, it is possible to provide the assembled battery 150 that is space saving and where the temperature distribution is even.

Furthermore, according to the embodiment, since a radiator coolant is used as a coolant, it is possible to use the coolant as a radiator coolant for a vehicle and also for the cooling of the assembled battery 150. Hence, there is no need to separately prepare a coolant for cooling the battery.

Additionally, according to the embodiment, one cooling member 160 is provided for two or more cells 140, and one thermally conductive member 165 is provided for two or more cells 140; accordingly, it is possible to reduce the number of parts and save space.

Example

A further specific description will hereinafter be given of the present invention with an example.
1. Manufacturing of Cell
(Cell 2A)

Figure 28:
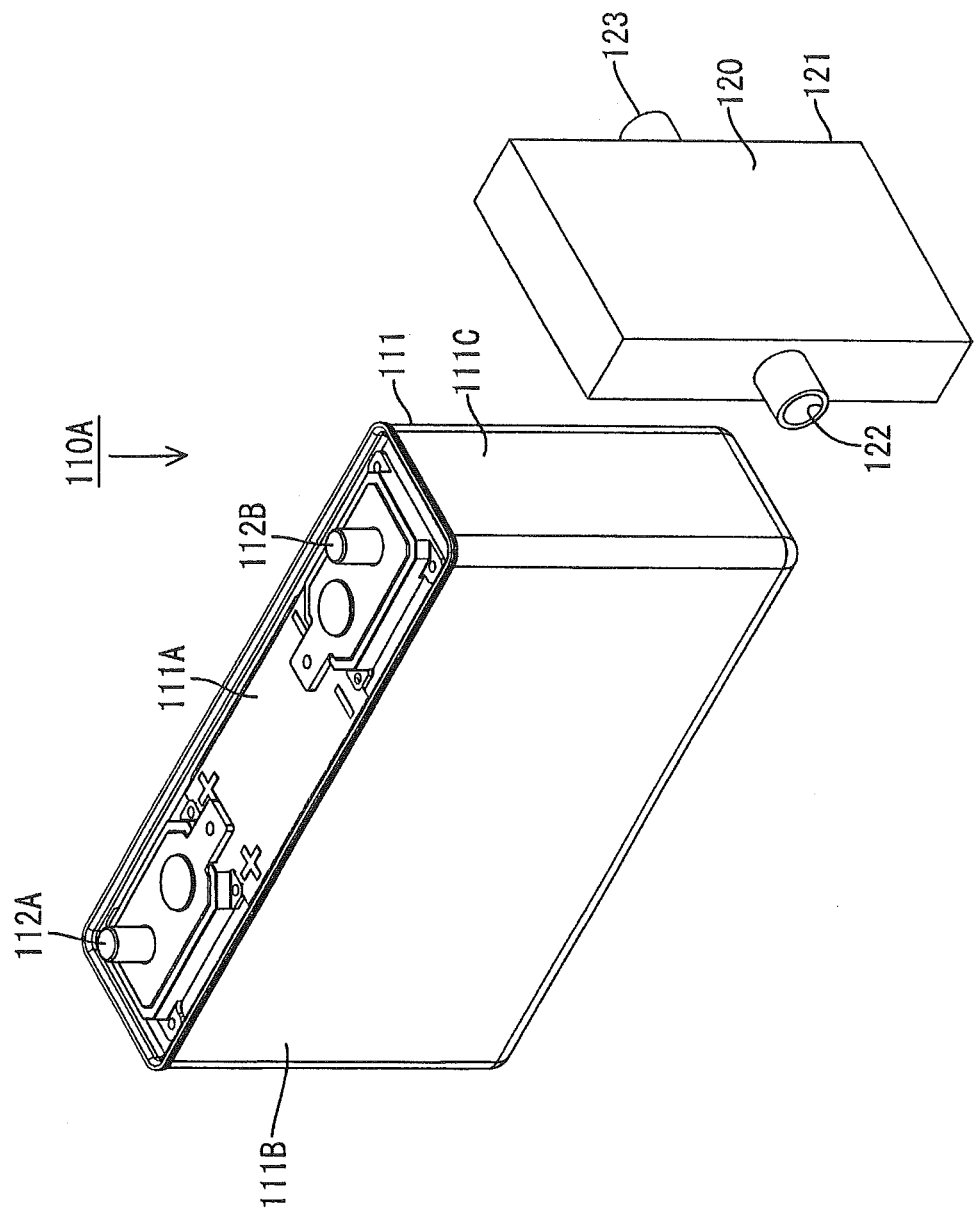
FIG. 28 is a perspective view of a cell 2A to be explained in Example.
Figure 29:
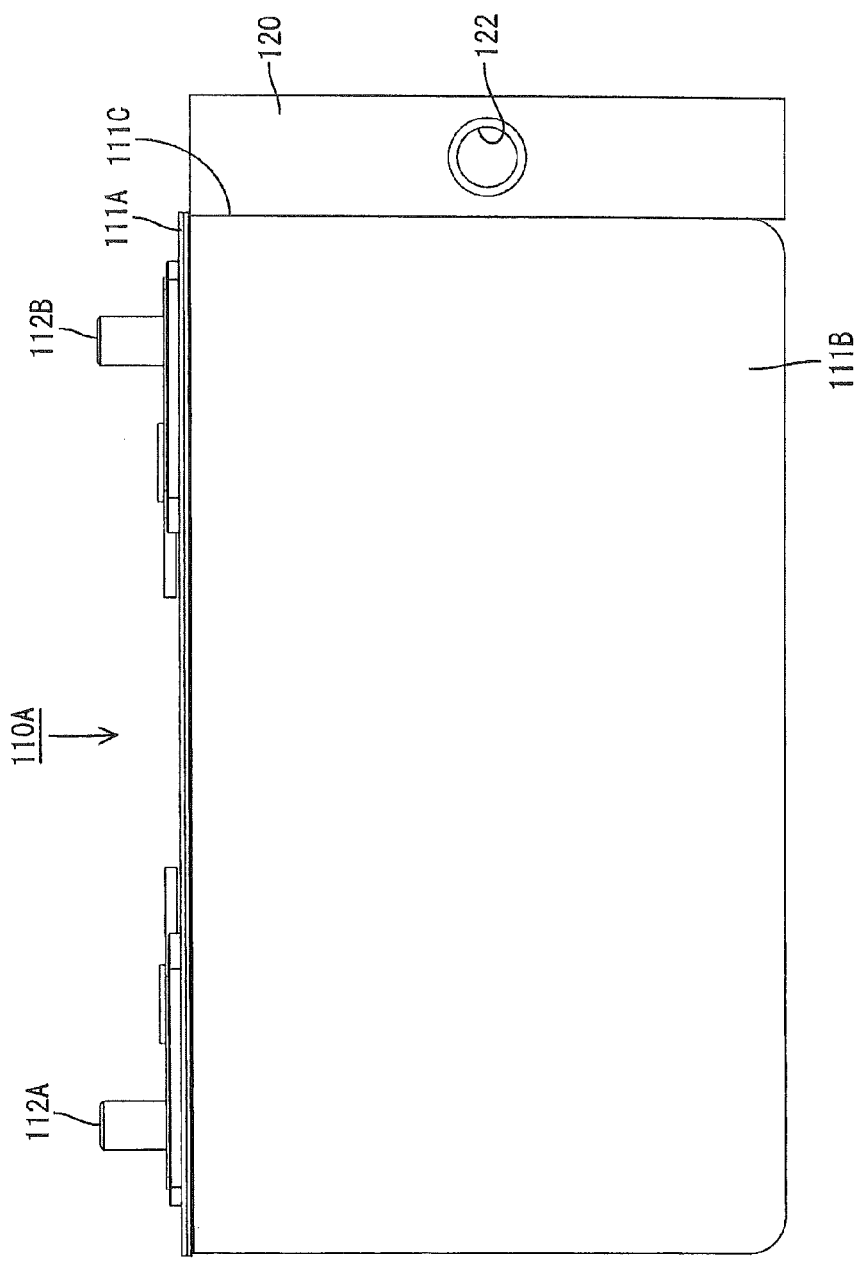
FIG. 29 is a side view of the cell 2A.

As shown in FIGS. 28 and 29, a cell 2A (reference numeral 110A in the drawing) was set to be one where the cooling member 120 for one cell was placed in direct contact with the surface having a small area 111C (short side surface 111C) among the side surfaces of the cuboid battery case 111 of a lithium-ion battery (product number: LEV50, battery capacity: 50 Ah) manufactured by Lithium Energy Japan. In FIGS. 28 and 29, the same reference numerals are attached to similar configurations to those in Embodiment 2-1.
(Cell 2B)

Figure 30:
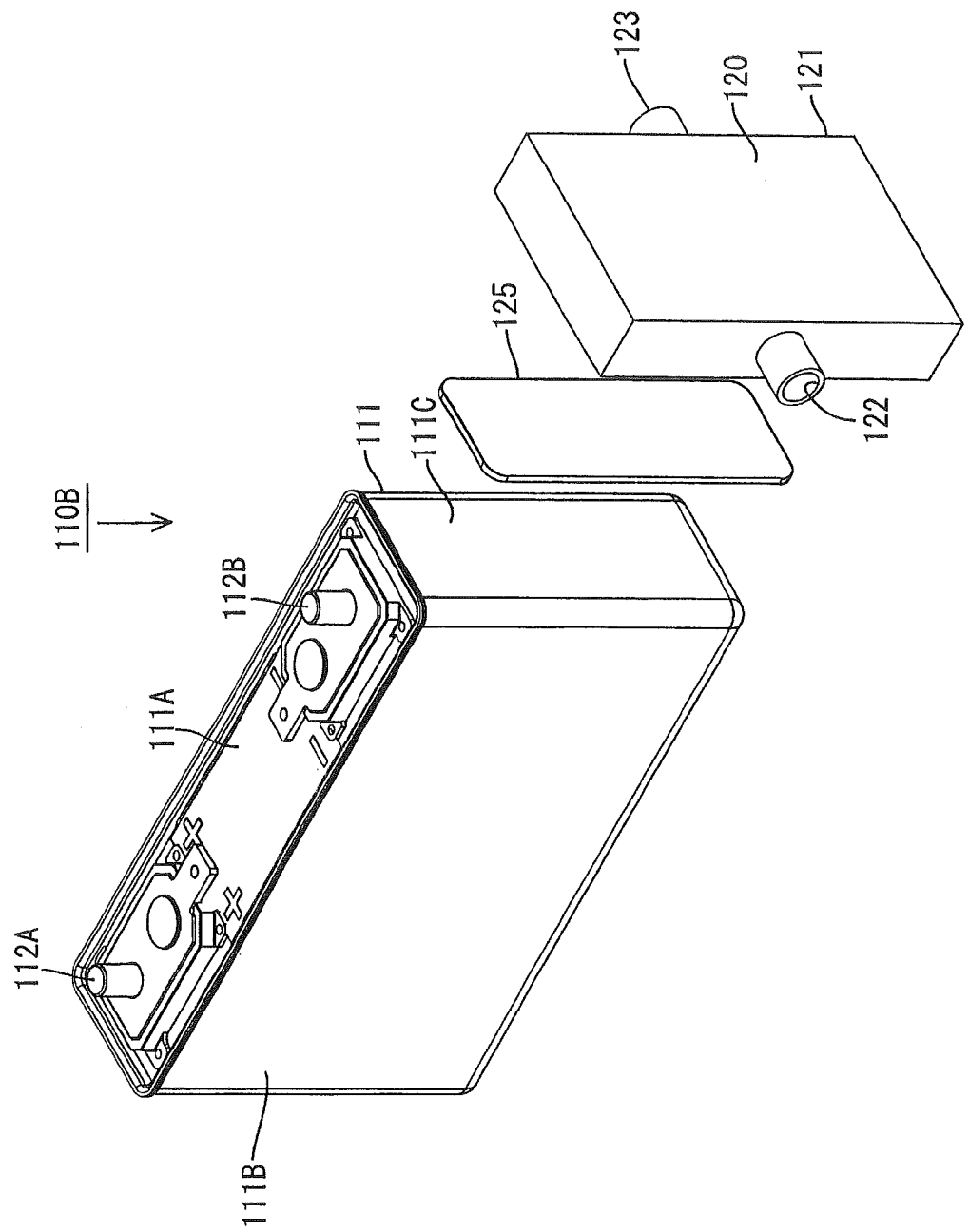
FIG. 30 is a perspective view of a cell 2B to be explained in Example.
Figure 31:
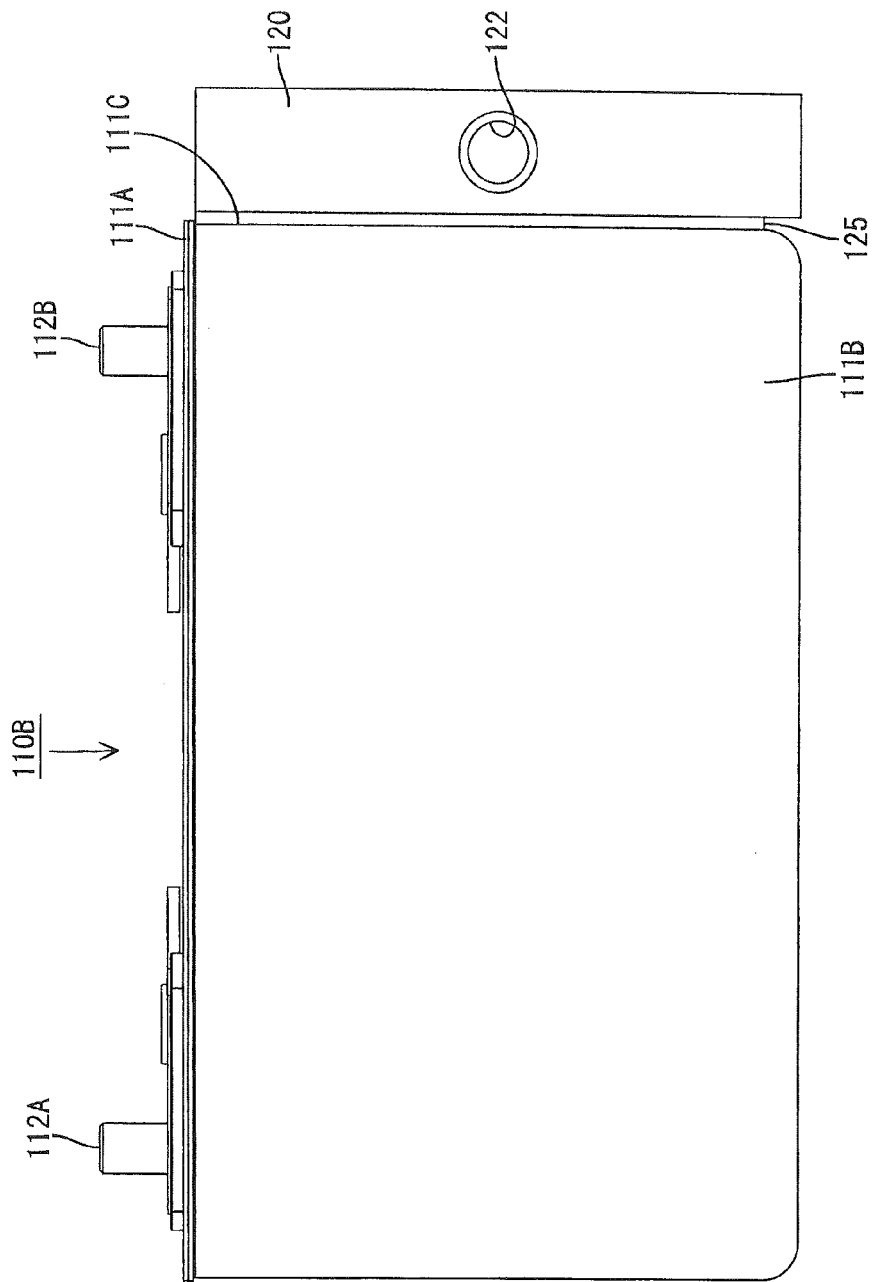
FIG. 31 is a side view of the cell 2B.

As shown in FIGS. 30 and 31, a cell 2B (reference numeral 110B in the drawing) was obtained in a similar manner to the cell 2A other than a point that the thermally conductive member 125 (a thermally conductive acrylic gel sheet manufactured by Sumitomo 3M Limited, product number: 5580H, thermal conductivity: 3 W/m·K, thickness: 1.0 mm) was placed between the short side surface 111C of the battery case 111 and the cooling member 120. In FIGS. 30 and 31, the same reference numerals are attached to the same configurations as those in Embodiment 2-1.
(Cell 2C)

A cell 2C was obtained in a similar manner to the cell 2A other than a point that the cooling member 120 for one cell was placed in contact with the bottom surface 111D of the battery case 111 (refer to FIGS. 21 and 23).
(Cell 2D)

A cell 2D was obtained in a similar manner to the cell 2C other than a point that the thermally conductive member 125 was placed between the bottom surface 111D of the battery case 111 and the cooling member 120 (refer to FIGS. 16 and 18).

Cell of Comparative Example 2-1

A cell of Comparative Example 2-1 was set to be a lithium-ion battery (a lithium-ion battery manufactured by Lithium Energy Japan (product number: LEV50)) where the cooling member 120 and the thermally conductive member 125 were not placed.

Cell of Comparative Example 2-2

Figure 32:
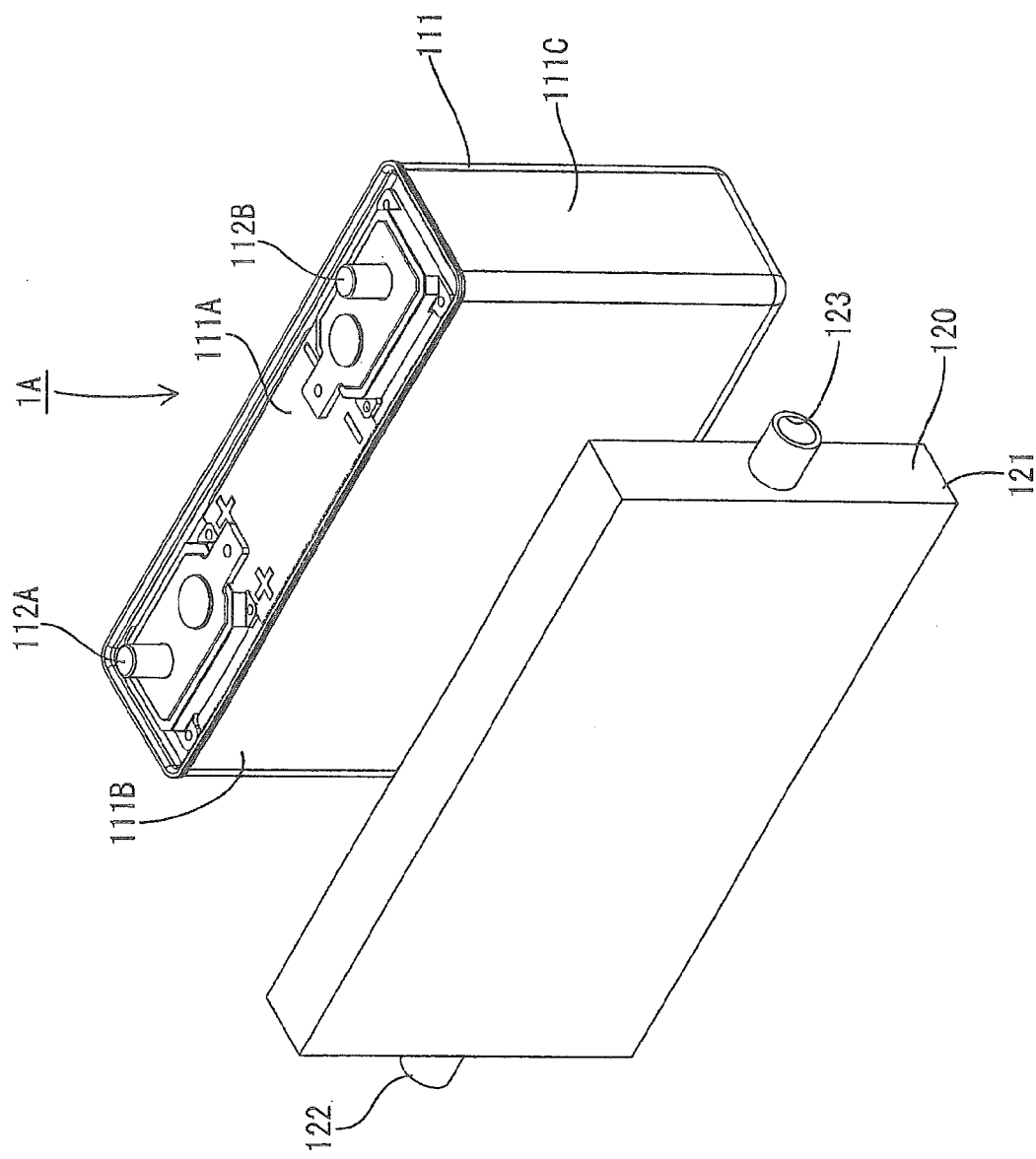
FIG. 32 is a perspective view of a cell of Comparative Example 2-2.
Figure 33:
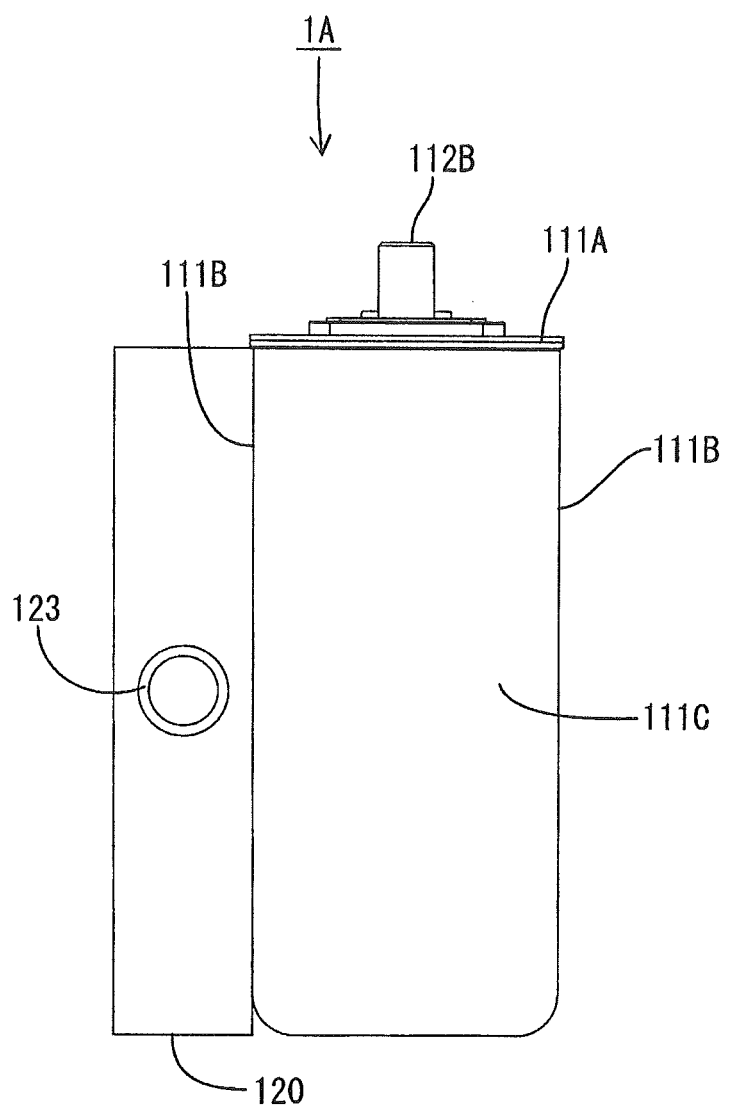
FIG. 33 is a side view of the cell of Comparative Example 2-2.

As shown in FIGS. 32 and 33, a cell 1A of Comparative Example 2-2 was set to be one where the cooling member 120 for one cell was placed in direct contact with the surface having a large area 111B (long side surface 111B) among the side surfaces of the cuboid battery case 111 of a lithium-ion battery (product number: LEV50, battery capacity: 50 Ah) manufactured by Lithium Energy Japan. In FIGS. 32 and 33, the same reference numerals are attached to similar configurations to those in Embodiment 2-1.

Cell of Comparative Example 2-3

Figure 34:
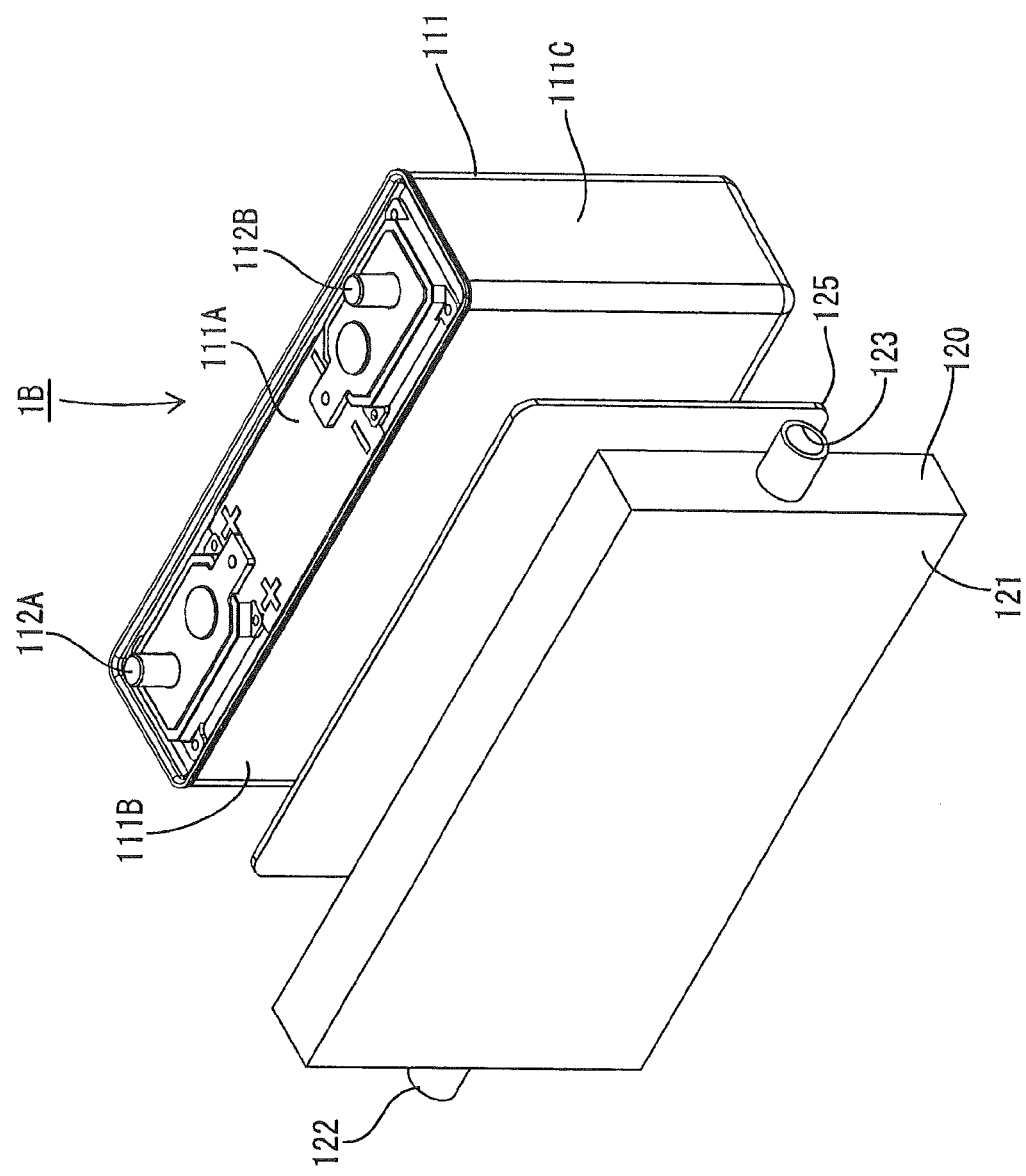
FIG. 34 is a perspective view of a cell of Comparative Example 2-3.
Figure 35:
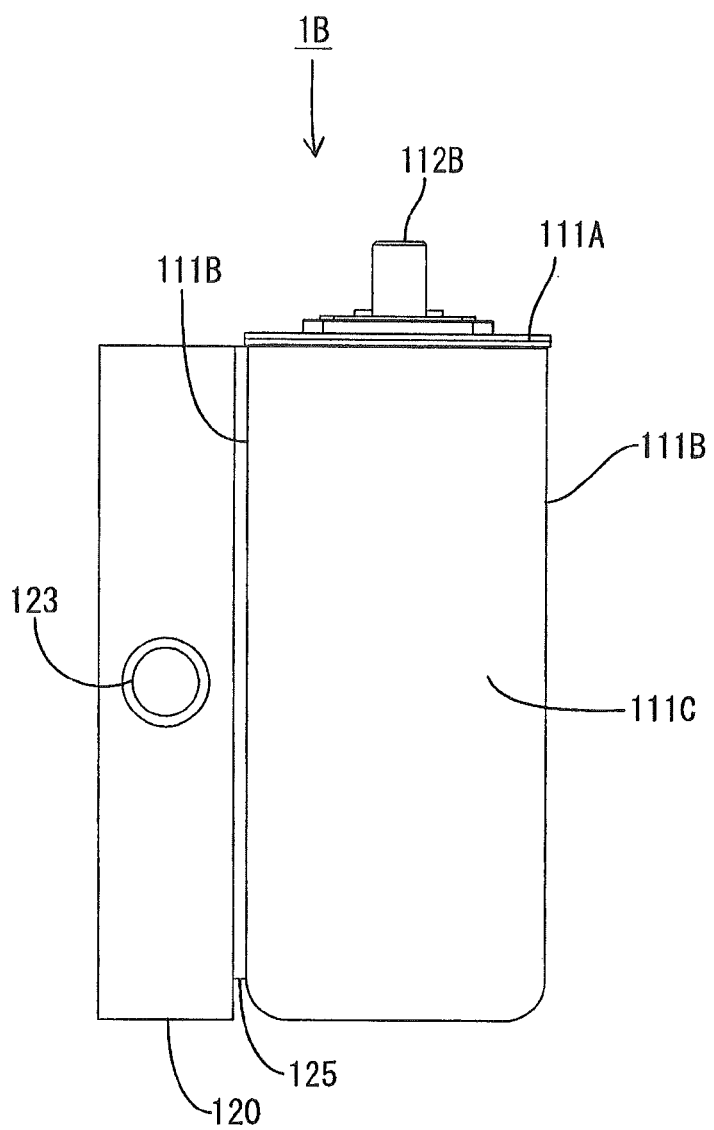
FIG. 35 is a side view of the cell of Comparative Example 2-3.

As shown in FIGS. 34 and 35, a cell 1B of Comparative Example 2-3 was obtained in a similar manner to the cell 2A other than a point that the thermally conductive member 125 (a thermally conductive acrylic gel sheet manufactured by Sumitomo 3M Limited, product number: 558011, thermal conductivity: 3 W/m·K, thickness: 1.0 mm) was placed between the long side surface 111B of the battery case 111 and the cooling member 120. In FIGS. 34 and 35, the same reference numerals are attached to similar configurations to those in Embodiment 2-1.

2. Evaluation Test

A cycle test was carried out under an atmosphere of 40° C. in the following method for the cells manufactured in 1. (the cells 2A to 2D and the cells of Comparative Examples 2-1 to 2-3) respectively.

Tap water at 35° C. was used as a coolant of the cooling member 120, and was circulated in the body portion 121 of the cooling member 120 at the velocity of 2.5 liter per minute.

The cells were charged at a constant current (1 CA) and a constant voltage (4.1 V) for four hours, and were discharged at a constant current (1 CA) and a cut-off voltage of discharge of 2.75 V. These were set to one cycle, and charge and discharge were repeated up to 1600 cycles.

The battery surface temperature of each cell was measured at intervals of 200 cycles and shown in Table 2.

In terms of the battery surface temperature, a thermocouple was attached to approximately the center of the long side surface 111B of the battery, and a maximum temperature in one cycle was measured.

TABLE 2

| Number of Cycles | Comparative Example 2-1 Not cooled | Comparative Example 2-2 Long side surface No sheet | Comparative Example 2-3 Long side surface With Sheet | Cell 2A Short side surface No Sheet | Cell 2B Short side surface With Sheet | Cell 2C Bottom surface No sheet | Cell 2D Bottom surface With Sheet |
|---|---|---|---|---|---|---|---|
| 0 | 40 | 38 | 38 | 38 | 38 | 38 | 38 |
| 200 | 42 | 40 | 40 | 39 | 39 | 39 | 39 |

TABLE 2-continued

| Number of Cycles | Comparative Example 2-1 Not cooled | Comparative Example 2-2 Long side surface No sheet | Comparative Example 2-3 Long side surface With Sheet | Cell 2A Short side surface No Sheet | Cell 2B Short side surface With Sheet | Cell 2C Bottom surface No sheet | Cell 2D Bottom surface With Sheet |
|---|---|---|---|---|---|---|---|
| 400 | 44 | 42 | 41 | 41 | 40 | 40 | 40 |
| 600 | 46 | 44 | 43 | 42 | 40 | 41 | 40 |
| 800 | 48 | 45 | 44 | 43 | 41 | 42 | 41 |
| 1000 | 49 | 46 | 45 | 44 | 41 | 43 | 41 |
| 1200 | 50 | 47 | 45 | 44 | 42 | 44 | 41 |
| 1600 | 51 | 48 | 45 | 45 | 42 | 44 | 41 |

3. Results and Discussion

As is clear from Table 2, increases in the battery surface temperatures of the cells 2A and 2B where the cooling member was placed in direct or indirect contact with the short side surface of the battery case and the cells 2C and 2D where the cooling member was placed in direct or indirect contact with the bottom surface of the battery case were more gentle than those of the cells of Comparative Examples 2-1 to 2-3.

It can be considered from this result that the cell of the present invention makes it possible to fully obtain the cooling effect by the cooling member; accordingly, the cooling performance of an assembled battery can be improved.

Moreover, an increase in the battery surface temperature of the cell 2C where only the cooling member was placed on the bottom surface was more gentle than that of the cell 2A where only the cooling member was placed on the short side surface. An increase in the battery surface temperature of the cell 2D where the cooling member and the thermally conductive sheet were placed on the bottom surface was more gentle than that of the cell 2B where the cooling member and the thermally conductive sheet were placed on the short side surface.

The results show that if the cooling member is placed on the bottom surface of the battery case, the cooling effect is higher.

Comparing the cells 2A and 2B, the cell 2B having the thermally conductive sheet had a higher effect of inhibiting temperature from increasing after 400 cycles than the cell 2A without the thermally conductive sheet. Also in a comparison between the cells 2C and 2D, the cell 2D having the thermally conductive sheet had a higher effect of inhibiting temperature from increasing after 600 cycles. The results show that even if a battery case deforms due to the long use of a battery, a cell having a thermally conductive member can maintain a large contact area of the battery case and a cooling member, and therefore it is possible to prevent a decrease in cooling effect.

Other Embodiments

The present invention is not limited to the embodiments explained in the above descriptions and with reference to the drawings, but, for example, the following embodiments, too, are included in the technical scope disclosed in the specification.

Figure 36:
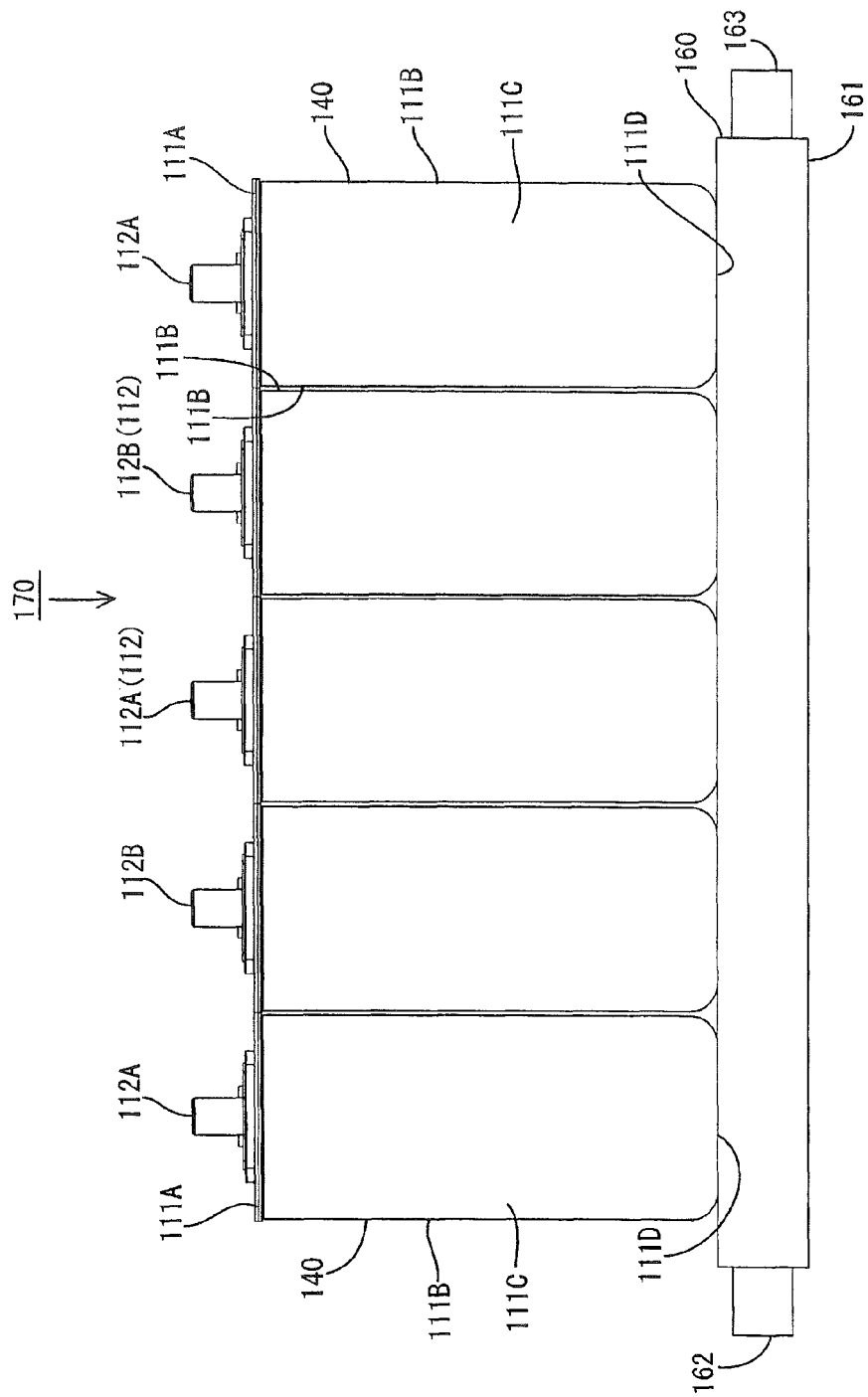
FIG. 36 is a side view of an assembled battery to be explained in another Embodiment 2-1.

2-(1) In Embodiment 2-2, shown is the configuration where the thermally conductive member 165 is placed between the battery case 111 and the cooling member 160, and the battery case 111 is in indirect contact with the cooling member 160; however, as shown in FIG. 36, the battery case 111 may be configured to be in direct contact with the cooling member 160. In this case, the cooling member 160 is configured to serve as a thermally conductive member, too. An assembled battery 170 shown in FIG. 36 has approximately the same configuration as the assembled battery 150 of Embodiment 2-2 other than the point that there is no thermally conductive member 165.

2-(2) In the embodiments and practical example, the cell and the assembled battery, which have the cooling member on only one surface of the battery case, are shown; however, the cooling member may be provided on two or more surfaces. As long as the cooling member is provided on a surface other than a surface having the largest area, the cooling member may be provided on the surface having the largest area.

2-(3) In Embodiment 2-2, one thermally conductive member is placed for five cells, and one cooling member is placed for five cells; however, the present invention is not limited to this. The present invention may be configured to include a thermally conductive member and a cooling member for every two cells. Moreover, the numbers of thermally conductive members and cooling members may not be the same.

2-(4) In Embodiment 2-2, shown as an assembled battery is one formed by arranging five cells to be opposite to their long side surfaces; however, it may be an assembled battery formed by arranging cells to be opposite to their short side surfaces. Moreover, the number of cells constituting an assembled battery may be more than or less than five.

2-(5) In the above embodiments and example, the cuboid battery case is shown, but the battery case may be long cylindrical shaped.

2-(6) An electric storage device is a cell capable of charging and discharging in the embodiments, but is not limited to this and may be a capacitor such as an electrochemical capacitor or an electric double layer capacitor.

2-(7) The configuration where the inner surface of the wall of the battery case is away from the electric storage element includes a configuration where a gap is formed between the inner surface of the wall of the battery case and the electric storage element, and also includes a configuration where the battery case is not in direct contact with the electric storage element by positioning a buffer material between the inner surface of the wall of the battery case and the electric storage element.

What is claimed is:
1. An electric storage apparatus comprising:
  a plurality of electric storage devices arranged side by side, each electric storage device comprising:
    a case comprising a plurality of walls including:
      a terminal wall, an electrode terminal being formed on the terminal wall, the terminal wall including a long side and a short side;

a bottom wall opposite to the terminal wall, the bottom wall including a long side and a short side;

a short sidewall connecting the short sides of the terminal wall and the bottom wall; and a long sidewall connecting the long sides of the terminal wall and the bottom wall, the long sidewall comprising a greatest area of the areas of the plurality of walls; and an electric storage element which is housed in the case and separated from an inner surface of the bottom wall, the electric storage element being in electrical connection with the electrode terminal; and a sheet-shaped heat transfer member which is bonded by an adhesive to an outer surface of the bottom wall, wherein a first distance, in a direction intersecting the terminal wall and parallel to the short sidewall and the long sidewall, between the inner surface of the bottom wall and the electric storage element is less than a second distance, in a direction parallel to the terminal wall and the long sidewall and intersecting the short sidewall, between an inner surface of the short sidewall and the electric storage element.

2. The electric storage apparatus according to claim 1, wherein the heat transfer member comprises a thermal conductivity in a range from 0.2 W/m·K to 5.0 W/m·K.

3. The electric storage apparatus according to claim 1, wherein the heat transfer member comprises an electrically-insulating, synthetic resin.

4. The electric storage apparatus according to claim 3, wherein the synthetic resin comprises at least one member selected from the group consisting of nylon resin, acrylic resin, silicone resin, polyester resin, and polyolefin resin.

5. The electric storage apparatus according to claim 1, further comprising:

a cooling member in contact with the heat transfer member.

6. The electric storage apparatus according to claim 1, wherein the electric storage element comprises a winding type electric storage element in which positive and negative plates that are layered via a separator are wound.

7. The electric storage apparatus according to claim 6, wherein the electric storage element comprises a plurality of electric storage elements which are arranged in a direction which intersects the long sidewall.

8. The electric storage apparatus according to claim 5, wherein the cooling member comprises a circulation path for circulating a liquid coolant.

9. The electric storage apparatus according to claim 5, wherein the cooling member comprises a metal plate.

10. The electric storage apparatus according to claim 5, wherein the heat transfer member comprises a metal plate.

11. An electric storage apparatus comprising:

a plurality of electric storage devices arranged side by side, each electric storage device comprising:

a case comprising a plurality of walls including:

a terminal wall, an electrode terminal being formed on the terminal wall, the terminal wall including a long side and a short side;

a bottom wall opposite to the terminal wall, the bottom wall including a long side and a short side;

a short sidewall connecting the short sides of the terminal wall and the bottom wall; and a long sidewall connecting the long sides of the terminal wall and the bottom wall, the long sidewall comprising a greatest area of the areas of the plurality of walls; and an electric storage element which is housed in the case and separated from an inner surface of the bottom wall, the electric storage element being in electrical connection with the electrode terminal; and a sheet-shaped heat transfer member which is bonded by an adhesive to an outer surface of the bottom wall, wherein a first distance, in a direction intersecting the terminal wall and parallel to the short sidewall and the long sidewall, between the inner surface of the bottom wall and the electric storage element is less than a second distance, in a direction parallel to the terminal wall and the long sidewall and intersecting the short sidewall, between an inner surface of the short sidewall and the electric storage element, and wherein a third distance, in a direction parallel to the terminal wall and the short sidewall and intersecting the long sidewall, between an inner surface of the long sidewall and the electric storage element is less than the first distance.

12. An electric storage device comprising:

a case comprising a plurality of walls including:

a terminal wall, an electrode terminal being formed on the terminal wall;

a bottom wall formed opposite the terminal wall;

a short sidewall connecting the terminal wall and the bottom wall; and a long sidewall connecting the terminal wall and the bottom wall and comprising an area which is greater than an area of the terminal wall, an area of the bottom wall and an area of the short sidewall;

an electric storage element which is housed in the case and separated from an inner surface of the bottom wall, the electric storage element being in electrical connection with the electrode terminal; and a sheet-shaped heat transfer member which is bonded by an adhesive to an outer surface of the bottom wall, wherein a first distance, in a direction intersecting the terminal wall and parallel to the short sidewall and the long sidewall, between the inner surface of the bottom wall and the electric storage element is less than a second distance, in a direction parallel to the terminal wall and the long sidewall and intersecting the short sidewall, between an inner surface of the short sidewall and the electric storage element, and wherein a third distance, in a direction parallel to the terminal wall and the short sidewall and intersecting the long sidewall, between an inner surface of the long sidewall and the electric storage element is less than the first distance.

* * * * *